United States Patent
Taguchi et al.

(10) Patent No.: US 12,120,176 B2
(45) Date of Patent: Oct. 15, 2024

(54) CONTROL METHOD, SERVER, AND RECORDING MEDIUM

(71) Applicant: Panasonic Intellectual Property Corporation of America, Torrance, CA (US)

(72) Inventors: Masahiro Taguchi, Osaka (JP); Yuji Unagami, Osaka (JP); Tetsuji Fuchikami, Osaka (JP); Yuuki Hirose, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/590,220

(22) Filed: Feb. 1, 2022

(65) Prior Publication Data

US 2022/0159065 A1     May 19, 2022

Related U.S. Application Data

(63) Continuation of application No. PCT/JP2020/030941, filed on Aug. 17, 2020.

(60) Provisional application No. 62/893,432, filed on Aug. 29, 2019.

(51) Int. Cl.
| | |
|---|---|
| *H04L 67/1074* | (2022.01) |
| *H04L 9/08* | (2006.01) |
| *H04L 67/104* | (2022.01) |
| *H04L 67/1095* | (2022.01) |
| *H04L 67/56* | (2022.01) |
| *H04L 9/00* | (2022.01) |

(52) U.S. Cl.
CPC ......... *H04L 67/108* (2013.01); *H04L 9/0825* (2013.01); *H04L 67/1055* (2013.01); *H04L 67/1095* (2013.01); *H04L 67/56* (2022.05); *H04L 9/50* (2022.05); *H04L 2209/463* (2013.01)

(58) Field of Classification Search
CPC .................. H04L 67/108; H04L 67/56; H04L 67/1055; H04L 67/1095; H04L 9/0825; H04L 9/50; H04L 2209/463
USPC ......................................................... 709/203
See application file for complete search history.

(56) References Cited

U.S. PATENT DOCUMENTS

| | | | | |
|---|---|---|---|---|
| 10,579,779 | B2 * | 3/2020 | Wright | G06F 21/6281 |
| 10,762,506 | B1 * | 9/2020 | Cash | G06Q 20/206 |
| 10,951,615 | B1 * | 3/2021 | Paczkowski | H04W 12/71 |
| 10,986,500 | B1 * | 4/2021 | Marquardt | H04L 63/12 |
| 11,100,197 | B1 * | 8/2021 | Bernardi | H04L 9/3297 |
| 11,210,372 | B2 * | 12/2021 | Savanah | G06F 21/121 |

(Continued)

OTHER PUBLICATIONS

International Search Report (ISR) issued on Oct. 27, 2020 in International (PCT) Application No. PCT/JP2020/030941.

(Continued)

*Primary Examiner* — Ranodhi Serrao
(74) *Attorney, Agent, or Firm* — Wenderoth, Lind & Ponack, L.L.P.

(57) ABSTRACT

A control method includes: receiving transaction data that includes (i) peer information used for connecting a first peer among peers in a P2P system to another peer among the peers and (ii) a signature added to the peer information by the first peer; verifying the received transaction data using the signature included in the transaction data; and storing the transaction data into the distributed ledger when the verifying is successful.

13 Claims, 14 Drawing Sheets

(56) References Cited

U.S. PATENT DOCUMENTS

| | | | |
|---|---|---|---|
| 11,294,991 B2* | 4/2022 | Savanah | H04L 63/0823 |
| 11,418,529 B2* | 8/2022 | Colquhoun | H04L 63/1433 |
| 11,514,443 B2* | 11/2022 | Sato | G06F 16/2379 |
| 2018/0349621 A1* | 12/2018 | Schvey | G06F 21/645 |
| 2019/0279172 A1* | 9/2019 | Duffield | H04L 9/3247 |
| 2019/0333059 A1* | 10/2019 | Fallah | G06F 16/1834 |
| 2019/0334904 A1* | 10/2019 | Lelcuk | H04L 9/3213 |
| 2019/0370792 A1* | 12/2019 | Lam | G06Q 20/065 |
| 2019/0379642 A1* | 12/2019 | Simons | H04L 63/0414 |
| 2020/0092088 A1* | 3/2020 | Novotny | G06F 21/64 |
| 2020/0151715 A1* | 5/2020 | Sato | G06Q 20/389 |
| 2020/0410559 A1* | 12/2020 | Qaudeer | H04M 15/50 |
| 2021/0014073 A1* | 1/2021 | Currie | H04L 9/0841 |
| 2021/0111875 A1* | 4/2021 | Le Saint | H04L 9/0861 |
| 2021/0185386 A1* | 6/2021 | Kong | H04N 21/4394 |
| 2021/0203482 A1* | 7/2021 | Li | H04L 9/3297 |
| 2021/0218710 A1* | 7/2021 | Fallah | H04L 63/0876 |
| 2022/0107994 A1* | 4/2022 | Bernardi | G06F 21/105 |
| 2022/0108262 A1* | 4/2022 | Cella | G06Q 10/063118 |
| 2022/0141002 A1* | 5/2022 | Tate | H04L 9/3268 |
| | | | 713/171 |
| 2022/0150050 A1* | 5/2022 | Gundavelli | H04L 63/123 |
| 2022/0159065 A1* | 5/2022 | Taguchi | H04L 67/56 |
| 2022/0198441 A1* | 6/2022 | Dalton | G06Q 20/0658 |
| 2022/0253933 A1* | 8/2022 | Sako | G06Q 20/3825 |
| 2022/0271915 A1* | 8/2022 | Turner | H04L 9/3247 |
| 2022/0384027 A1* | 12/2022 | Kaleal, III | G16H 20/40 |
| 2022/0405750 A1* | 12/2022 | Fallah | G06F 16/1834 |
| 2022/0414664 A1* | 12/2022 | Liu | G06Q 20/4016 |
| 2023/0073337 A1* | 3/2023 | Chan | H04L 9/3247 |

OTHER PUBLICATIONS

Bitcoin Developer Guide, Internet URL: https://btcinformation.org/en/developer-guide#block-prototypes, Searched on Jul. 1, 2020.

* cited by examiner

CONTROL METHOD, SERVER, AND RECORDING MEDIUM

CROSS REFERENCE TO RELATED APPLICATIONS

This is a continuation application of PCT International Application No. PCT/JP2020/030941 filed on Aug. 17, 2020, designating the United States of America, which is based on and claims priority of U.S. Provisional Patent Application No. 62/893,432 filed on Aug. 29, 2019. The entire disclosures of the above-identified applications, including the specifications, drawings and claims are incorporated herein by reference in their entirety.

FIELD

The present disclosure relates to a control method, a server, and a recording medium.

BACKGROUND

To participate in a peer-to-peer (P2P) network, a peer establishes a peer connection on the basis of peer information obtained from a server or a different peer (Non-Patent Literature [NPL] 1).

CITATION LIST

Non Patent Literature

NPL 1: Bitcoin Developer Guide [searched on Jul. 1, 2020], Internet URL: https://btcinformation.org/en/developer-guide#block-prototypes

SUMMARY

Technical Problem

Unfortunately, the peer information has had an issue in tamper resistance and reliability.

In response to this, the present disclosure has an object to provide a control method and so forth that are capable of appropriately managing peer information.

Solution to Problem

In accordance with an aspect of the present disclosure, a control method is executed by a server among servers included in a peer-to-peer (P2P) management system, and each of the servers holding a distributed ledger. The control method includes: receiving transaction data including peer information and a signature, the peer information being used for connecting a first peer among peers in a P2P system to another peer among the peers, the signature being added to the peer information by the first peer; verifying the received transaction data using the signature included in the transaction data; and storing the transaction data into the distributed ledger of the server when the verifying is successful.

It should be noted that these general and specific aspects may be implemented to a system, a device, an integrated circuit, a computer program, or a computer-readable recording medium such as a Compact Disc-Read Only Memory (CD-ROM), or may be any combination of them.

Advantageous Effects

The control method according to the present disclosure enables appropriate management of peer information.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
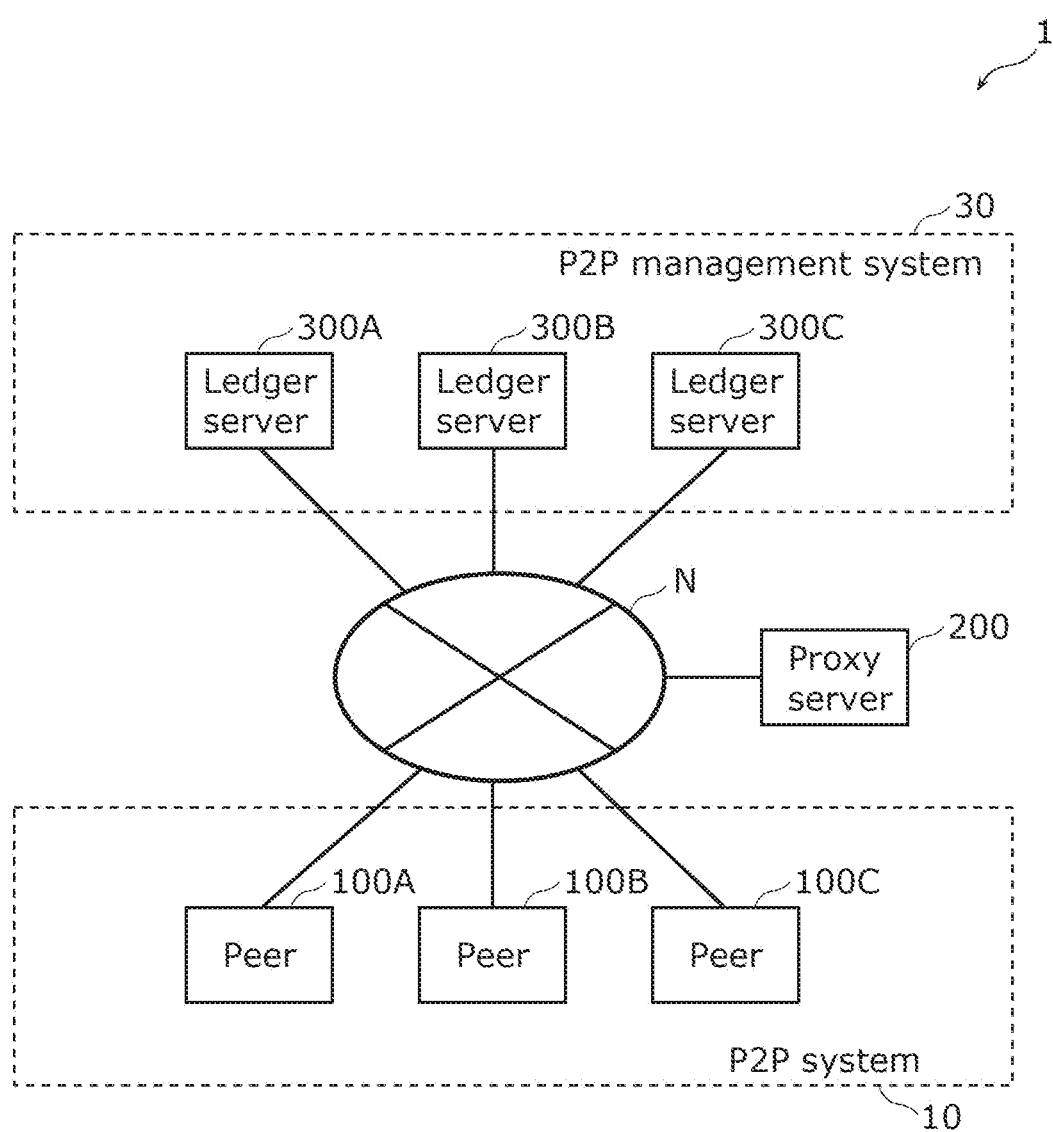
FIG. 1 schematically illustrates an overall configuration of a system according to Embodiment 1.

DESCRIPTION OF EMBODIMENTS (Underlying Knowledge Forming Basis of the Present Disclosure)

In relation to the technology of the peer-to-peer (P2P) network disclosed in the Background section, the inventors have found the following problem:

Examples of the method used in a P2P network to obtain information about a different peer that participates in this network include: a method (for a hybrid P2P network) by which a peer individually sends an inquiry to a server that manages information about all peers participating in the P2P network; and a method (for a pure P2P network) by which information is exchanged between peers that are connected to each other. By either method, the peer that is to participate in the P2P network establishes a peer connection on the basis of peer information obtained from the server or the different peer (see NPL 1).

Unfortunately, in the hybrid P2P network, information centrally managed in a peer management server may be inappropriately rewritten intentionally or inadvertently. In this case, a peer that is to participate in this P2P network may possibly be led to a denial of service (DoS) attack, or the P2P network itself may shut down.

On the other hand, in the pure P2P network, a new peer that is to participate in this P2P network needs to know in some way about a peer that is to be an initial connection destination. Here, if connecting to a malicious peer, this new peer may be led to a Dos attack as described above or to a malicious P2P network.

In this way, the peer information has had an issue in tamper resistance and reliability.

In response to this, the present disclosure has an object to provide a control method and so forth that enable a server to appropriately manage peer information used in a P2P system.

In order to solve the above problem, in accordance with an aspect of the present disclosure, a control method that is executed by a server among servers included in a peer-to-peer (P2P) management system, each of the servers holding a distributed ledger, includes: receiving transaction data including peer information and a signature, the peer information being used for connecting a first peer among peers in a P2P system to another peer among the peers, the signature being added to the peer information by the first peer; verifying the received transaction data using the signature included in the transaction data; and storing the transaction data into the distributed ledger of the server when the verifying is successful.

With this, the server manages the transaction data including the peer information in the distributed ledger. Based on the characteristics that the peer information stored in the distributed ledger is substantially resistant to tampering, the peer information is managed to be protected against tampering. Thus, the server is capable of appropriately managing the peer information.

For example, it is possible that the transaction data is transaction data generated to include the peer information that is updated, the generating being performed when the peer information held by the first peer is updated.

With this, the server receives the transaction data including the updated peer information and then manages this transaction data in the distributed ledger. This enables the transaction data stored in the distributed ledger to keep the peer information up-to-date. Thus, the server is capable of appropriately managing the latest peer information.

For example, it is also possible that the control method further includes: when a request for reading of the peer information is received, reading the peer information from the transaction data stored in the distributed ledger; and transmitting the peer information to a requesting peer that has transmitted the request among the peers.

With this, in response to the obtain request for the peer information, the server transmits the peer information appropriately stored. In this way, the server is capable appropriately managing the peer information by appropriately providing the peer information.

For example, it is further possible that in the reading, one or more items of peer information are red as the peer information, the one or more items of peer information each corresponding to a respective one of one or more peers among the peers and each being red with reference to the distributed ledger, and that in the transmitting, at least one item of peer information having a parameter within a predetermined range is transmitted as the peer information, the at least one item of peer information being included in the one or more items of peer information red in the reading, the predetermined range indicating that a corresponding peer of the item of peer information is appropriate for connection.

With this, the server transmits the peer information of the peer that is appropriate for connection. This allows the peer receiving this peer information to connect to the peer indicated by the peer information transmitted by the server. This enables the peer to selectively connect to the peer that is appropriate for connection. Thus, the server is capable appropriately managing the peer information by appropriately providing the peer information of the peer appropriate for connection.

For example, it is further possible that in the reading, one or more items of peer information are red as the peer information, the one or more items of peer information each corresponding to a respective one of one or more peers among the peers and each being red with reference to the distributed ledger, and that the transmitting includes: determining an appropriate peer that is appropriate for connection, on the basis of the one or more items of peer information red in the reading; and transmitting an item of peer information corresponding to the appropriate peer determined in the determining.

With this, the server transmits the peer information of the peer determined, by the server, as the peer appropriate for connection. This allows the peer receiving this peer information to connect to the peer indicated by the peer information transmitted by the server. This enables the peer to connect to the peer that is appropriate for connection. Thus, the server is capable of appropriately managing the peer information by determining and providing the peer information of the peer appropriate for connection, and is thus capable of controlling the P2P network.

For example, it is still further possible that the storing includes: sharing the transaction data among the servers and executing a predetermined consensus algorithm on the transaction data; and when validity of the transaction data is agreed upon by the servers in the executing, storing the transaction data into the distributed ledger of each of the servers.

With this, after verifying that the validity of the transaction data to be stored into the distributed ledger is agreed on among the plurality of servers, the server stores this transaction data into the distributed ledger. Thus, the server is capable of more appropriately managing the peer information by using the distributed ledgers of the plurality of servers.

For example, it is still further possible that the peer information includes at least one of: identification information of the first peer; an Internet Protocol (IP) address of the first peer; a port number to be used by the first peer to communicate with another peer among the peers; identification information of a peer currently connected to the first peer; a duration of participation of the first peer in the P2P system; a duration of connection between the first peer and the peer currently connected to the first peer; a public key of the first peer; or a maximum allowable number of connections of the first peer.

With this, the server is capable of appropriately manage the peer information in more detail by using, as the peer information: the identification information of the peer; the IP address of the peer; the port number; the identification information of the peer currently connected; the duration of participation; the duration of connection; the public key; or the maximum allowable number of connections. Thus, the server is capable of controlling the P2P network.

For example, it is still further possible that the P2P management system is connected to the P2P system via a proxy server, the first peer transmits the peer information and the signature to the proxy server, the proxy server generates proxy transaction data that includes the peer information and the signature transmitted by the first peer, and transmits the proxy transaction data generated to the server, and in the receiving, the proxy transaction data transmitted by the proxy server is received as the transaction data.

With this, the server uses the distributed ledger to manage the transaction data including the peer information transmitted from the peer via the proxy server. In this case, the peer may transmit only the peer information and the signature to the proxy server. This eliminates the need for implementing or executing processing, such as transaction data generation, related to the distributed ledger. Hence, the method advantageously reduces a processing load of the peer and thereby reduces power consumption. Thus, the server is capable of appropriately managing the peer information without implementing the processing related to the distributed ledger on the peer.

For example, it is still further possible that the P2P management system is connected to the P2P system.

With this, the server uses the distributed ledger to manage the transaction data including the peer information transmitted from the peer. This eliminates the need of a different peer between the peer and the server. Thus, the server advantageously manages the P2P system in a configuration from which a single point of failure is removed (in other words, a configuration with no single point of failure). Hence, the configuration with a relatively high availability enables the server to appropriately manage the peer information.

In accordance with another aspect of the present disclosure, a control method is used by a proxy server that acts as an intermediary between a peer-to-peer (P2P) system and a P2P management system, the P2P management system including servers each holding a distributed ledger, and the control method includes: receiving peer information and a signature, the peer information being used for connecting a first peer among peers in the P2P system to another peer among the peers, the signature being added to the peer information by the first peer; generating transaction data that includes the peer information and the signature each received in the receiving; and transmitting the transaction data generated to the servers included in the P2P management system.

With this, the proxy server generates the transaction data including the peer information transmitted from the peer and stores the generated transaction data into the distributed ledger of the server. In this case, the peer may transmit only the peer information and the signature to the proxy server. This eliminates the need for implementing or executing processing, such as transaction data generation, related to the distributed ledger. Hence, the method advantageously reduces a processing load of the peer and thereby reduces power consumption. Thus, the proxy server is capable of causing the server to appropriately manage the peer information, without implementing the processing related to the distributed ledger on the peer.

In accordance with still another aspect of the present disclosure, a server among servers included in a peer-to-peer (P2P) management system, each of the servers holding a distributed ledger, includes: a ledger controller; and a storage that stores the distributed ledger, wherein the ledger controller performs: receiving transaction data including peer information and a signature, the peer information being used for connecting a first peer among peers in a P2P system to another peer among the peers, the signature being added to the peer information by the first peer; verifying the received transaction data using the signature included in the transaction data; and storing the transaction data into the distributed ledger when the transaction data is verified successfully.

With this, the server achieves the same advantageous effects as those achieved by the control method described above.

In accordance with still another aspect of the present disclosure, a non-transitory computer-readable recording medium has recorded thereon a computer program for causing a computer to execute the control method described above.

With this, the recording medium achieves the same advantageous effects as those achieved by the control method described above.

It should be noted that these general and specific aspects may be implemented to a system, a device, an integrated circuit, a computer program, or a computer-readable recording medium such as a Compact Disc-Read Only Memory (CD-ROM), or may be any combination of them.

Hereinafter, certain exemplary embodiments are described in greater detail with reference to the accompanying Drawings.

Each of the exemplary embodiments described below shows a general or specific example. The numerical values, shapes, materials, elements, the arrangement and connection of the elements, steps, the processing order of the steps etc. shown in the following exemplary embodiments are mere examples, and therefore do not limit the scope of the appended claims and their equivalents. Therefore, among the elements in the following exemplary embodiments, those not recited in any one of the independent claims are described as optional elements.

Embodiment 1

The following describes a P2P management system that appropriately manages peer information and a control method for the P2P management system, according to the present embodiment.

The present embodiment describes, as an example, a P2P peer that records P2P connection information held by the P2P peer into a distributed ledger and then establishes a P2P connection with reference to the distributed ledger, with reference to the drawings.

1.1 Overall System Configuration

FIG. 1 illustrates an overall configuration of system 1 according to the present embodiment.

As illustrated in FIG. 1, system 1 includes peers 100A, 100B, and 100C, proxy server 200, and ledger servers 300A, 300B, and 300C. These devices are connected via network N.

Each of peers 100A, 100B, and 100C is a computer included in P2P system 10. The number of peers included in P2P system 10 is not limited to three, and may be at least one.

Each of ledger servers 300A, 300B, and 300C is a server device (also simply referred to as a server) included in P2P management system 30. The number of peers included in P2P management system 30 is not limited to three, and may be at least one.

Peer 100A is one of P2P peers included in P2P system 10. Peer 100A is communicably connected, via network N, to different peers 100B and 100C included in P2P system 10. Peer 100A transmits and receives information to and from the different peers by communication, and thereby achieves some of predetermined functions provided by P2P system 10. The predetermined functions include, but are not limited to: a function of holding a large number of electronic files that are distributed among a plurality of peers and providing a corresponding file to a requester; and a function of executing large-scale calculation that is shared among the plurality of peers and providing a result of the calculation to a requester.

Peer 100A holds peer information (described later) used for connection between peers included in P2P system 10. Peer 100A enters the peer information in P2P management system 30 via proxy server 200. Moreover, peer 100A obtains peer information entered in P2P management system 30 via proxy server 200, and connects to an unconnected peer using the obtained peer information.

Each of peers 100B and 100C has the same function as peer 100A, and operates independently of peer 100A. Peers 100A, 100B, and 100C operate and thereby enable P2P system 10 to achieve the predetermined functions.

As a proxy for peer 100A for instance, proxy server 200 enters peer information in a distributed ledger held by P2P system 30 and reads peer information from the distributed ledger.

Ledger server 300A is one of P2P peers included in P2P management system 30. Ledger server 300A manages peer information of a peer included in P2P system 10, using a distributed ledger. Distributed ledger 300A is communicably connected, via network N, to different ledger servers 300B and 300C included in P2P management system 30.

Ledger server 300A is connected to peer 100A etc. via proxy server 200. Ledger server 300A stores transaction data including the peer information received from peer 100A etc. into the distributed ledger. Moreover, Ledger server 300A reads the peer information from the transaction data stored in the distributed ledger and provides this information to peer 100A etc. via proxy server 200.

Each of ledger servers 300B and 300C has the same function as ledger server 300A, and operates independently of ledger server 300A. Ledger servers 300A, 300B, and 300C operate and thereby enable P2P management system 30 to achieve a function of managing P2P system 10.

Hereinafter, peer 100A etc., proxy server 200, and ledger server 300A etc. are described in detail.

1.2 Configuration of Peer 100A

Figure 2:
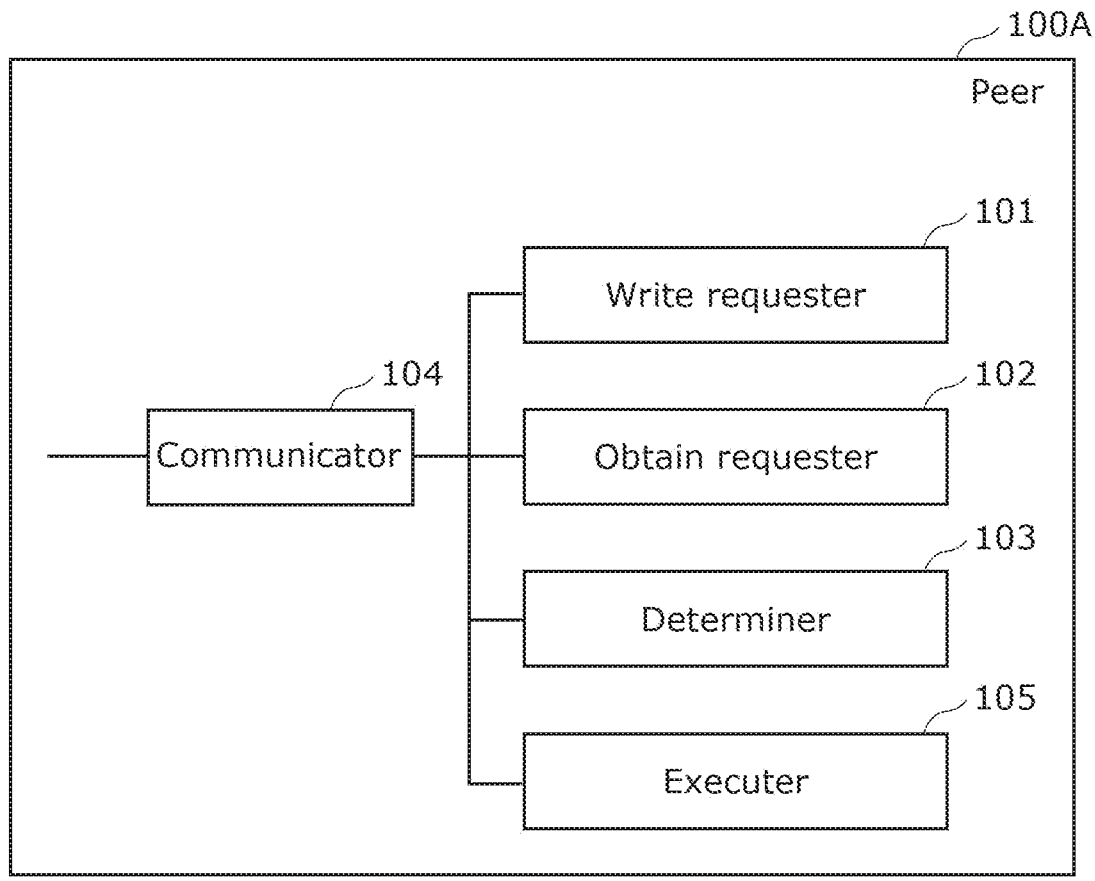
FIG. 2 is a block diagram illustrating a function configuration of a peer according to Embodiment 1.

FIG. 2 is a block diagram illustrating a function configuration of peer 100A according to the present embodiment. Note that each of peers 100B and 100C has the same configuration as peer 100A.

As illustrated in FIG. 2, peer 100A includes write requester 101, obtain requester 102, determiner 103, communicator 104, and executer 105. Each of these functional components included in peer 100A may be implemented by a processor (such as a central processing unit [CPU]) that is included in peer 100A and executes a predetermined program using a memory.

Write requester 101 is a functional component that requests writing of peer information of an own peer, that is, peer 100A, into the distributed ledger. Write requester 101 creates the peer information used for a P2P connection between the own peer, that is, peer 100A and a different peer included in P2P system 10. Moreover, write requester 101 generates write-request data for the generated peer information and transmits this write-request data added with a signature to proxy server 200. In this way, write requester 101 requests writing into the distributed ledger. A specific example of the peer information is described in detail later.

Obtain requester 102 is a functional component that requests obtaining of peer information from the distributed ledger. Obtain requester 102 generates obtain-request data (also simply referred to as the obtain request) used for obtaining the peer information recorded in the distributed ledger and transmits this generated obtain-request data to proxy server 200. Then, obtain requester 102 obtains, via proxy server 200, the peer information transmitted by ledger server 300A for instance in response to the obtain-request data. Moreover, obtain requester 102 performs detection processing to detect tampering made on the peer information obtained in this way. Tampering detection is performed using the signature added to the peer information written.

Determiner 103 is a functional component that determines a peer that is to establish a P2P connection with the own peer. The determination of the peer may be made using the peer information obtained by obtain requester 102.

Communicator 104 is a communication interface device that is connected to network N. Communicator 104 communicates with proxy server 200 and different peers 100B and 100C via network N.

Executer 105 is a functional component that executes a predetermined program to achieve some of the predetermined functions provided by P2P system 10.

1.3 Configuration of Proxy Server 200

Figure 3:
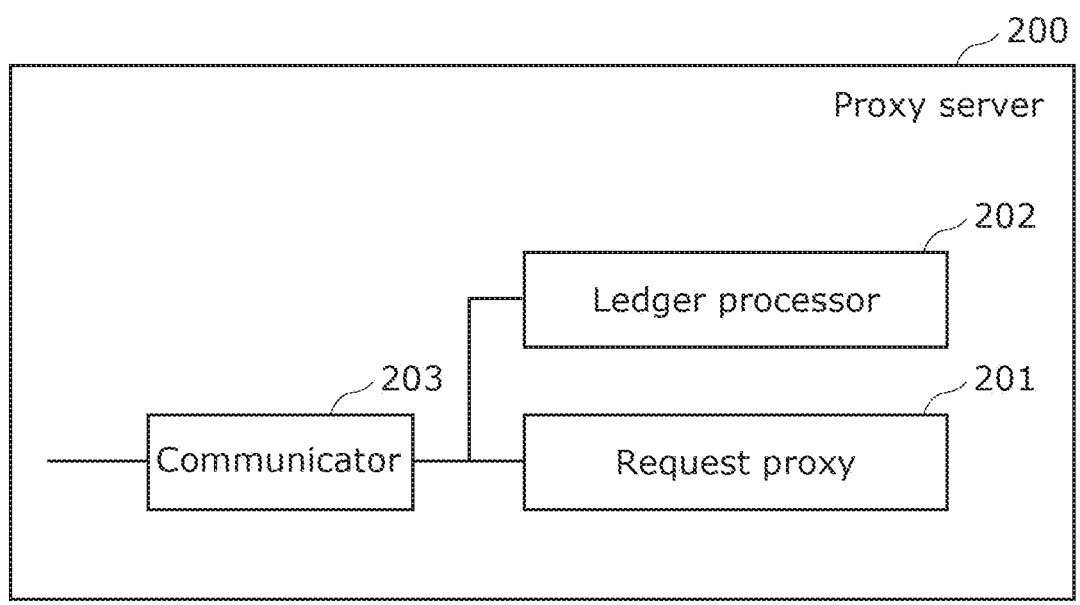
FIG. 3 is a block diagram illustrating a function configuration of a proxy server according to Embodiment 1.

FIG. 3 is a block diagram illustrating a function configuration of proxy server 200 according to the present embodiment.

As illustrated in FIG. 3, proxy server 200 includes request proxy 201, ledger processor 202, and communicator 203. Each of these functional components included in proxy server 200 may be implemented by a processor (such as a CPU) that is included in proxy server 200 and executes a predetermined program using a memory.

Request proxy 201 is the functional component that acts as a proxy for peer 100A for instance, and writes or reads data into or from the distributed ledger of ledger server 300A for instance. To be more specific, if receiving a request from peer 100A for instance, request proxy 201 controls ledger processor 202 on the basis of the received request. For example, if receiving write-request data for the peer information, request proxy 201 instructs ledger processor 202 to generate transaction data. If receiving obtain-request data for the peer information, request proxy 201 instructs ledger processor 202 to read the peer information with reference to the distributed ledger.

Ledger processor 202 is the functional component that writes or reads data into or from the distributed ledger of ledger server 300A for instance. To be more specific, ledger processor 202, which is under the control of request proxy 201, generates transaction data including the write-request data received from peer 100A and transmits the transaction data to ledger server 300A for instance. Moreover, ledger processor 202, under the control of request proxy 201, generates read-request data used for reading the peer information from the distributed ledger on the basis of the obtain-request data received from peer 100A and transmits the read-request data to ledger server 300A for instance. If receiving, from ledger server 300A for instance, a response to the read-request data, ledger processor 202 transmits this response to peer 100A.

When transmitting the transaction data to ledger server 300A for instance, ledger processor 202 may execute a consensus algorithm or a part of processing such as mining.

Communicator 203 is a communication interface device that is connected to network N. Communicator 203 communicates with peer 100A etc. and ledger servers 300A etc. via network N.

1.4 Configuration of Ledger Server 300A

Figure 4:
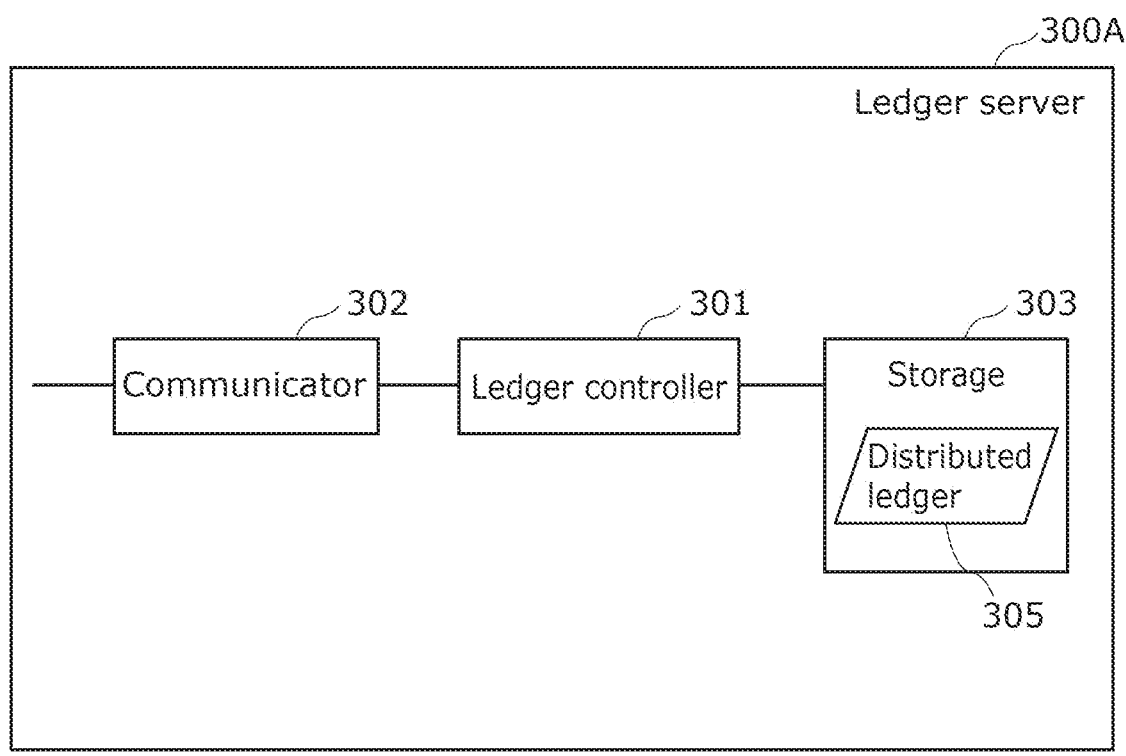
FIG. 4 is a block diagram illustrating a function configuration of a ledger server according to Embodiment 1.

FIG. 4 is a block diagram illustrating a function configuration of ledger server 300A according to the present embodiment. Note that each of ledger servers 300B and 300C has the same configuration as ledger server 300A.

As illustrated in FIG. 4, ledger server 300A includes ledger controller 301, communicator 302, and storage 303. Each of these functional components included in ledger server 300A may be implemented by a processor (such as a CPU) that is included in ledger server 300A and executes a predetermined program using a memory.

Ledger controller 301 is the functional component that controls distributed ledger 305. To be more specific, ledger controller 301 writes transaction data into distributed ledger 305 stored in storage 303, and reads transaction data stored in distributed ledger 305.

More specifically, ledger controller 301 receives transaction data that includes: peer information used for connection between a first peer (peer 100A, for example) and a different peer (peer 100B, for example) among the plurality of peers included in P2P system 10; and a signature added to the peer information by the first peer. Ledger controller 301 verifies the received transaction data using the signature included in the received transaction data. If the verification is successful, ledger controller 301 stores this transaction data into distributed ledger 305. Here, the transaction data is transmitted by proxy server 200.

Note that when the peer information held by the first peer is updated, the transaction data to be received by ledger controller 301 may include the updated peer information.

If receiving read-request data (also simply referred to as a read request) for peer information, ledger controller 301 reads the peer information from the transaction data stored in distributed ledger 305 and transmits the read peer information to a requester that transmitted the read-request data. When transmitting the read peer information, ledger controller 301 may transmit, among the peer information read with reference to distributed ledger 305, at least one item of peer information having a parameter within a predetermined range that indicates that the present peer is appropriate for connection. When transmitting the read peer information, ledger controller 301 may determine a peer appropriate for connection on the basis of the peer information read with reference to distributed ledger 305 and then transmit the peer information of the determined peer.

Distributed ledger 305 may be in any form. For example, one form of distributed ledger is a blockchain. This case is described as an example. However, a distributed ledger based on a different algorithm (such as IOTA or hashgraph) may be adopted.

Note that, when storing new transaction data, the distributed ledger may or may not execute a consensus algorithm (such as Practical Byzantine Fault Tolerance [PBFT], Proof of Work [PoW], or Proof of Stake [PoS]) to agree on the validity of this transaction data. Examples of distributed ledger technology that executes no consensus algorithm include Hyperledger Fabric.

Communicator 302 is a communication interface device that is connected to network N. Communicator 302 communicates with proxy server 200 and different ledger servers 300B and 300C via network N.

Storage 303 is a storage device that stores distributed ledger 305. Ledger controller 301 writes or reads transaction data into or from storage 303.

Figure 5:
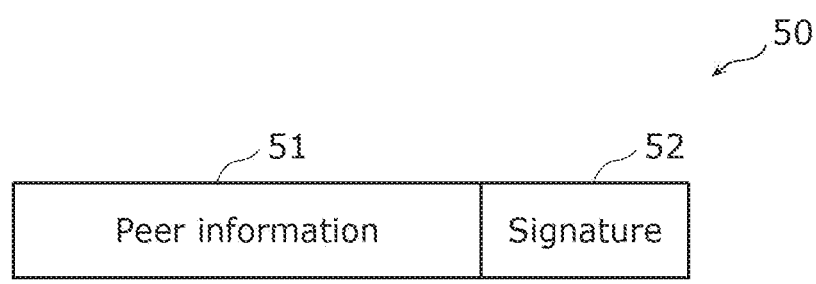
FIG. 5 illustrates an example of transaction data according to Embodiment 1.

FIG. 5 illustrates an example of transaction data 50 according to the present embodiment.

As illustrated in FIG. 5, transaction data 50 includes peer information 51 and signature 52.

Peer information 51 relates to a P2P connection between one peer (peer 100A, for example) and a different peer (peer 100B or 100C, for example) included in P2P system 10.

For example, peer information 51 includes at least one of: identification information of the peer; an Internet Protocol (IP) address of the peer; a port number used by the peer to communicate with a different peer; identification information of a peer currently connected to the peer; a duration of participation of the peer in P2P system 10; a duration of connection between the peer and the peer currently connected; a public key of the peer; or a maximum allowable number of connections of the peer.

Signature 52 is an electronic signature added to peer information 51 by the peer that generates peer information 51.

In the present embodiment, transaction data 50 is generated by proxy server 200. Proxy server 200 generates transaction data 50 including peer information of a peer and a signature of the peer that are received from the peer, and transmits transaction data 50 to ledger server 300A for instance. In this way, proxy server 20 stores transaction data 50 into ledger server 300A. Based on characteristics that information in distributed ledger 305 is resistant to tampering, transaction data 50 is stored and managed to be protected against tampering.

The following describes operations executed by peer 100A etc., proxy server 200, and ledger server 300A etc. having the configurations described above.

Figure 6:
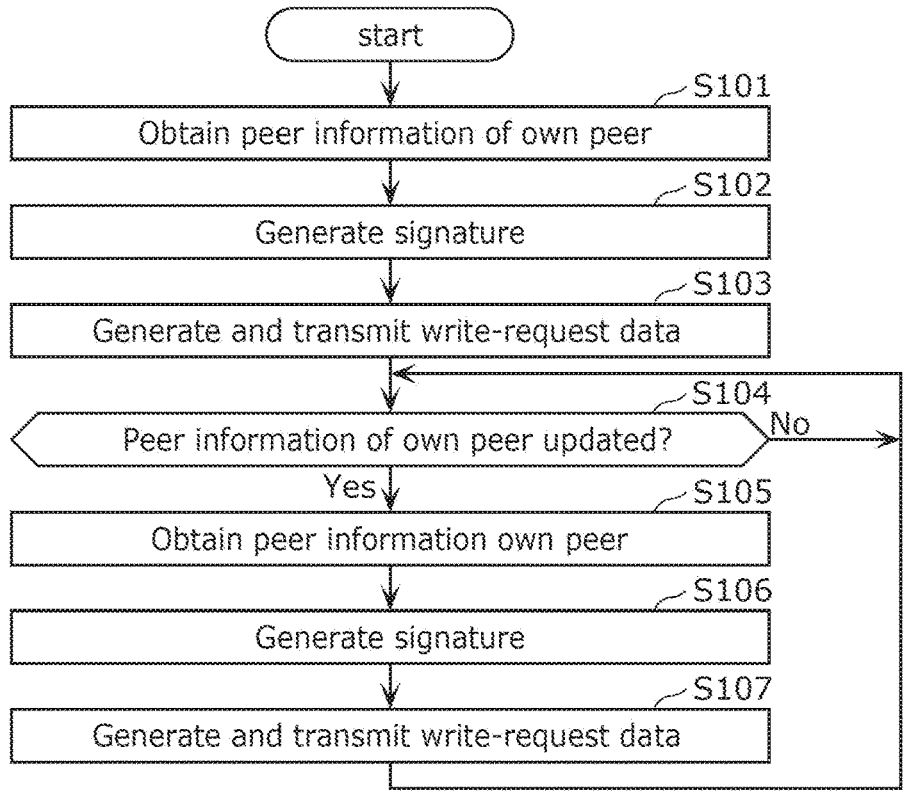
FIG. 6 is a flowchart illustrating processing executed by a peer to write peer information of an own peer, according to Embodiment 1.

FIG. 6 is a flowchart illustrating processing executed by peer 100A to write peer information of the own peer, according to the present embodiment. For example, the processing illustrated in FIG. 6 is started when peer 100A participates in P2P system 10.

In Step S101, write requester 101 obtains peer information of the own peer, that is, peer 100A.

In Step S102, write requester 101 generates a signature using a private key of the own peer and add the generated signature to the peer information obtained in Step S101.

In Step S103, write requester 101 generates write-request data including the peer information obtained in Step S101 and the added signature generated in Step S102, and transmits the generated write-request data to proxy server 200. The peer information and signature included in the transmitted write-request data are added into the transaction data by proxy server 200. Then, the peer information and signature are managed by ledger server 300A for instance to be protected against tampering.

In Step S104, write requester 101 determines whether the peer information of the own peer has been updated after the peer information of the own peer was obtained last time. If determining that the peer information of the own peer has been updated (Yes in Step S104), write requester 101 proceeds to Step S105. Otherwise, (No in Step S104), write requester 101 proceeds to Step S104. More specifically, write requester 101 waits at Step S104 until the peer information is updated. Note that the peer information is updated when the IP address of peer 100A or the port number used by peer 100A to communicate with a different peer is updated, for example.

In Step S105, write requester 101 obtains peer information of the own peer, that is, peer 100A.

In Step S106, write requester 101 generates a signature for the peer information obtained in Step S105.

In Step S107, write requester 101 generates write-request data including the peer information obtained in Step S105 and the added signature generated in Step S106, and transmits the generated write-request data to proxy server 200. As in Step S103, the peer information and signature included in the transmitted write-request data are added into the transaction data by proxy server 200. Then, the peer information and signature are managed by ledger server 300A for instance to be protected against tampering. After the end of Step S107, write requester 101 proceeds to Step S104.

By following a sequence of processes illustrated in FIG. 6 to participate in P2P system 10, peer 100A stores the peer information of the own peer into ledger server 300A for instance and, whenever the peer information of the own peer is updated, stores the updated peer information of the own peer into ledger server 300A for instance.

Figure 7:
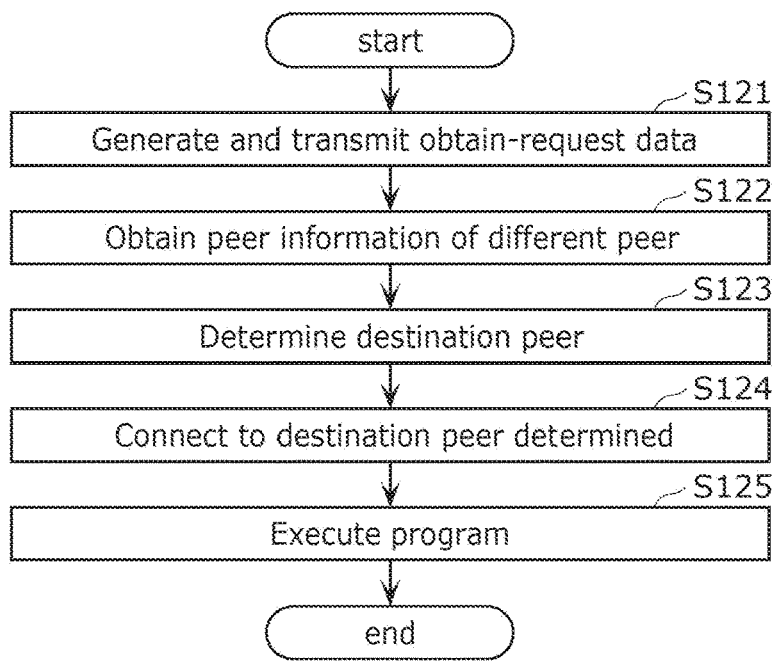
FIG. 7 is a flowchart illustrating processing executed by the peer to obtain peer information of a different peer when participating in a P2P system, according to Embodiment 1.

FIG. 7 is a flowchart illustrating processing executed by the peer to obtain peer information of a different device when participating in the P2P system, according to the present embodiment. This example describes a case where peer 100B obtains peer information of a different device, that is, peer 100A, and then connects to peer 100A to participate in P2P system 10.

In Step S121, obtain requester 102 generates obtain-request data and transmits the generated obtain-request data to proxy server 200. Here, the obtain-request data refers to a request for peer information of at least one peer to which peer 100B is allowed to connect among the peers that participate in P2P system 10.

In Step S122, obtain requester 102 obtains the peer information of the different device. Here, the obtain-request data transmitted in Step S121 is received by ledger server 300A via proxy server 200. Receiving the obtain-request data, ledger server 300A reads the peer information of the at least one peer from distributed ledger 305 and transmits this peer information. Thus, this peer information is to be obtained by obtain requester 102. Peer 100A is included in the at least one peer.

In Step S123, on the basis of the peer information of the at least one peer obtained by obtain requester 102 in Step S122, determiner 103 determines a peer (also referred to as a destination peer) to which peer 100B is to connect. In this example, peer 100A is determined as the destination peer.

For example, on the basis of the peer information of the at least one peer, determiner 103 may determine, as the destination peer among the at least one peer, a peer located from the own peer at a physical distance that is shorter than a predetermined distance or a peer located from the own peer at a physical distance that is outside a predetermined range. For example, on the basis of the peer information of the at least one peer, determiner 103 may determine, as the destination peer among the at least one peer, a peer connected to more than a predetermined number of peers or a peer connected to peers the total number of which is within a predetermined range. For example, on the basis of the peer information of the at least one peer, determiner 103 may determine, as the destination peer among the at least one peer, a peer that has been participating in P2P system 10 for a duration longer than a predetermined duration or a peer that has been participating in P2P system 10 for a duration that is within a predetermined range.

In Step S124, determiner 103 connects to the destination peer by executing connection processing to connect to the destination peer determined in Step S123.

In Step S125, executer 105 executes the predetermined program to achieve some of the predetermined functions provided by P2P system 10.

By following a sequence of processes illustrated in FIG. 7, peer 100B is allowed to connect to peer 100A and participate in P2P system.

Figure 8:
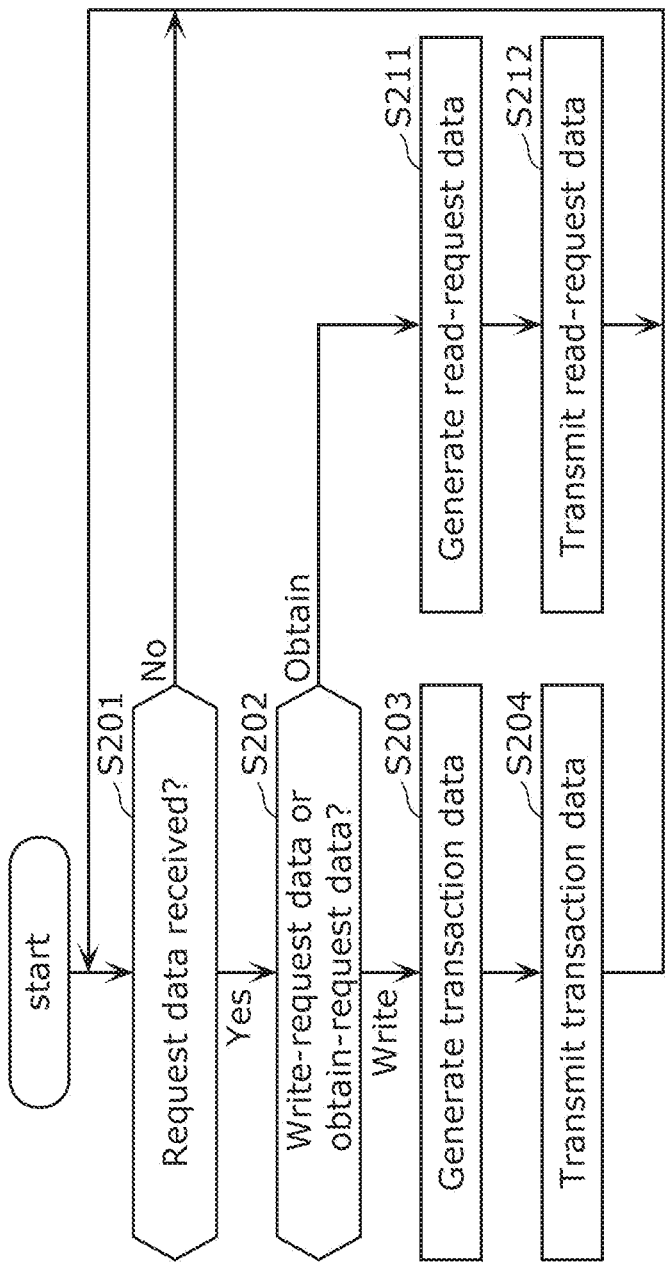
FIG. 8 is a flowchart illustrating processing executed by the proxy server to write or obtain peer information, according to Embodiment 1.

FIG. 8 is a flowchart illustrating processing executed by proxy server 200 to write or obtain peer information, according to the present embodiment.

In Step S201, request proxy 201 determines whether request data is received from peer 100A. If determining that the request data is received from peer 100A (Yes in Step S201), request proxy 201 proceeds to Step S202. Otherwise (No in Step S201), request proxy 201 executes Step S201 again. More specifically, request proxy 201 waits at Step S201 until the request data is received.

In Step S202, request proxy 201 determines whether the request data received in Step S201 is write-request data or obtain-request data. If determining that the request data is write-request data ("Write" in Step S202), request proxy 201 proceeds to Step S203. If determining that the request data is obtain-request data ("Obtain" in Step S202), request proxy 201 proceeds to Step S211.

In Step S203, ledger processor 202 generates transaction data including the peer information and signature that are included in the write-request data received in Step S201.

In Step S204, ledger processor 202 transmits the transaction data generated in Step S203 to ledger server 300A for instance. After the end of Step S204, ledger processor 202 proceeds to Step S201.

In Step S211, ledger processor 202 generates read-request data to read the peer information from the distributed ledger.

In Step S212, ledger processor 202 transmits the read-request data generated in Step S211 to ledger server 300A for instance. After the end of Step S212, ledger processor 202 proceeds to Step S201.

By following a sequence of processes illustrated in FIG. 8, proxy server 200 acts as a proxy for peer 100A and writes or obtains the peer information in response to the write-request data or obtain-request data received from peer 100A.

Figure 9:
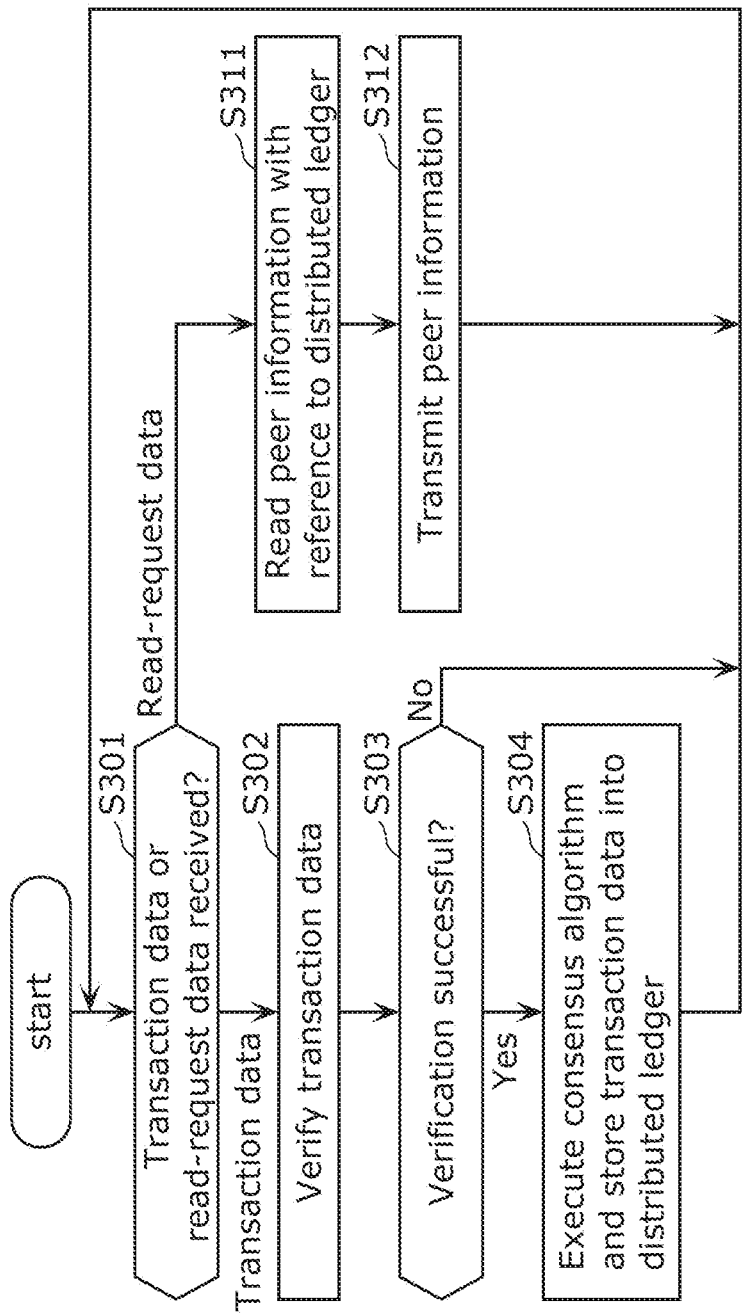
FIG. 9 is a flowchart illustrating processing executed by the ledger server to write or read peer information, according to Embodiment 1.

FIG. 9 is a flowchart illustrating processing executed by ledger server 300A to write or read peer information, according to the present embodiment.

In Step S301, ledger controller 301 determines whether the transaction data or the read-request data is received from proxy server 200. If determining that the transaction data is received ("Transaction data" in Step S301), ledger controller 301 proceeds to Step S302. If determining that the read-request data is received ("Read-request data" in Step S301), ledger controller 301 proceeds to Step S311. Note that ledger controller 301 waits at Step S301 until the transaction data or the read-request data is received.

In Step S302, ledger controller 301 verifies the transaction data received in Step S301.

In Step S303, ledger controller 301 determines whether the verification in Step S302 is successful. If determining that the verification is successful (Yes in Step S303), ledger controller 301 proceeds to Step S304. Otherwise (No in Step S303), ledger controller 301 proceeds to Step S301.

In Step S304, ledger controller 301 stores the transaction data received in Step S301 into the distributed ledger stored in storage 303. When storing the transaction data into the distributed ledger, ledger controller 301 may also execute a consensus algorithm to agree on the validity of this transaction data. After the end of Step S304, ledger controller 301 proceeds to Step S301.

In Step S311, with reference to the distributed ledger stored in storage 303, ledger controller 301 reads the peer information from the transaction data stored in the distributed ledger.

In Step S312, ledger controller 301 transmits the peer information read in Step S312 to proxy server 200. When transmitting the peer information, ledger controller 301 may transmit, among the peer information read with reference to the distributed ledger, only the peer information that satisfies a predetermined condition indicating that the present peer is appropriate for connection. More specifically, among the read peer information corresponding to at least one peer, ledger controller 301 may provide only the peer information of a peer located at a physical distance that is shorter than a predetermined distance from peer 100A that is the requester or a peer located from peer 100A at a physical distance that is outside a predetermined range. For example, among the read peer information corresponding to the at least one peer, ledger controller 301 may provide only the peer information of a peer connected to more than a predetermined number of peers or a peer connected to peers the total number of which is within a predetermined range. For example, among the read peer information corresponding to the at least one peer, ledger controller 301 may provide only the peer information of a peer that has been participating in P2P system 10 for a duration longer than a predetermined duration or a peer that has been participating in P2P system 10 for a duration that is within a predetermined range.

After the end of Step S312, ledger controller 301 proceeds to Step S301.

By following a sequence of processes illustrated in FIG. 9, ledger server 300A is allowed to appropriately manage the peer information in the distributed ledger and then read the peer information in response to a read request.

Next, operations performed by system 1 are described. To be more specific, the following describes: processing executed by system 1 when peer information is entered and updated; and processing executed by system 1 when a new peer is to be connected.

1.5 Sequence Performed to Enter and Update Peer Information

Figure 10:
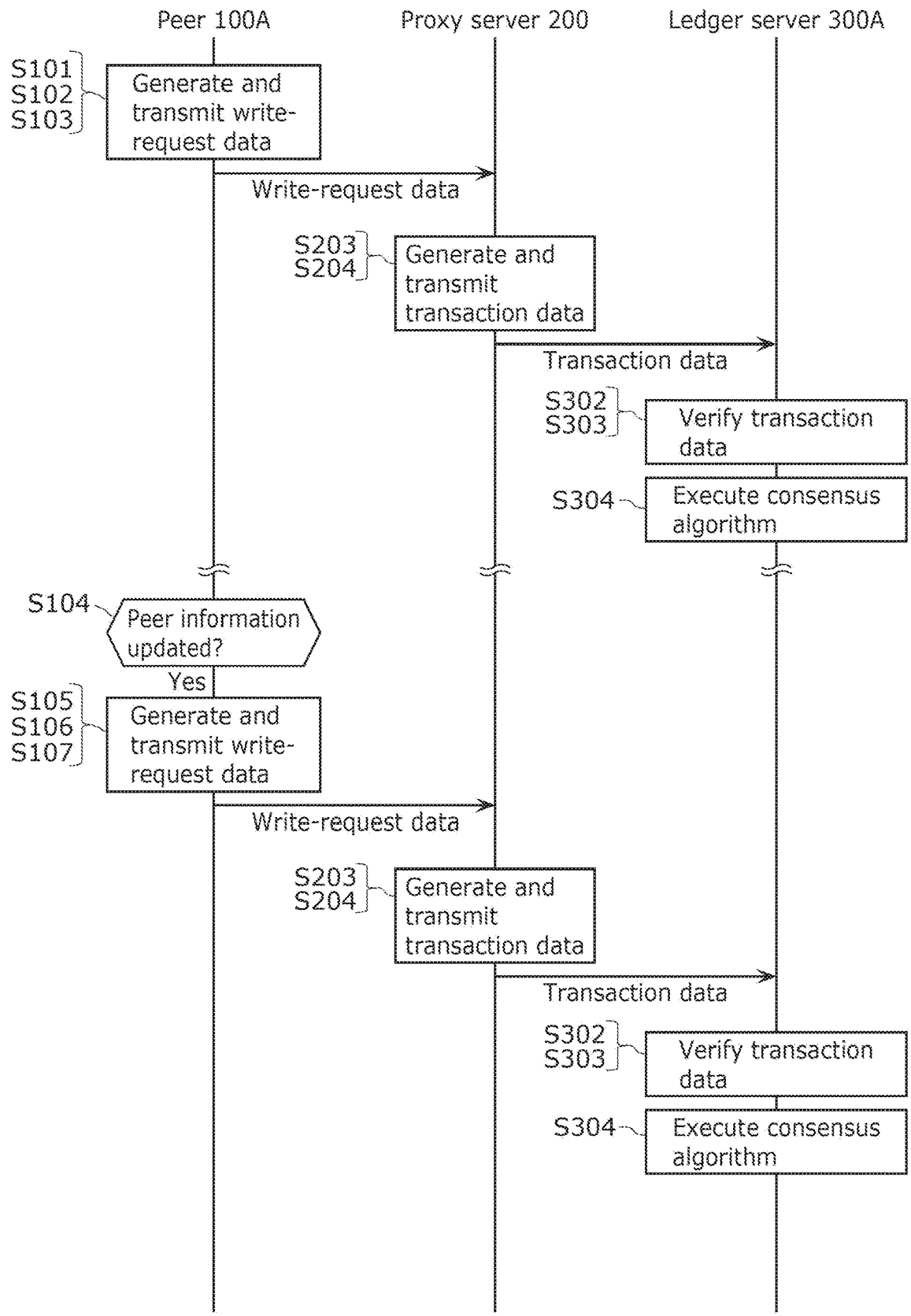
FIG. 10 is a sequence illustrating processing executed by the system to enter and update peer information, according to Embodiment 1.

FIG. 10 is a sequence illustrating processing executed by system 1 to enter and update peer information, according to the present embodiment. To be more specific, FIG. 10 illustrates processing performed to enter and update peer information by system 1, or more specifically, peer 100A, proxy server 200, and ledger server 300A for instance. Note that steps that are identical to those in the flowcharts described above are assigned the same step numbers as in the flowcharts described above, and that detailed description on these identical steps may be omitted.

Peer 100A generates write-request data including the peer information of the own peer, that is, peer 100A, and the signature added to the peer information, and transmits the generated write-request data to proxy server 200 (Steps S101 to S103).

Receiving the write-request data from peer 100A, proxy server 200 generates transaction data including the peer information and signature included in the received write-request data, and transmits the generated transaction data to ledger server 300A for instance (Steps S203 and S204). A transmission destination of the transaction data may be any one of ledger servers 300A etc. The present example describes a case where the transaction data is transmitted to ledger server 300A.

Ledger server 300A receives the transaction data and stores the received transaction data into distributed ledger 305. When storing the transaction data into distributed ledger 305, ledger server 300A executes a consensus algorithm with a different ledger server. This allows a block including the peer information added with the signature to be stored into distributed ledger 305. After this, it is substantially difficult to tamper with the peer information stored in distributed ledger 305. Thus, such management enables a safe reference to the peer information.

Peer 100A determines whether the peer information of the own peer, that is, peer 100A, is updated and, if so, generates write-request data similar to the above and transmits the generated write-request data to proxy server 200 (Steps S104 to S107).

Similar to the above, proxy server 200 generates transaction data including the peer information and signature included in the received write-request data, and transmits the generated transaction data to ledger server 300A for instance (Steps S203 and S204).

Similar to the above, ledger server 300A stores the received transaction data into distributed ledger 305.

After this, whenever the peer information is updated, the steps from Step S104 are executed.

1.6 Sequence for Peer Connection

Figure 11:
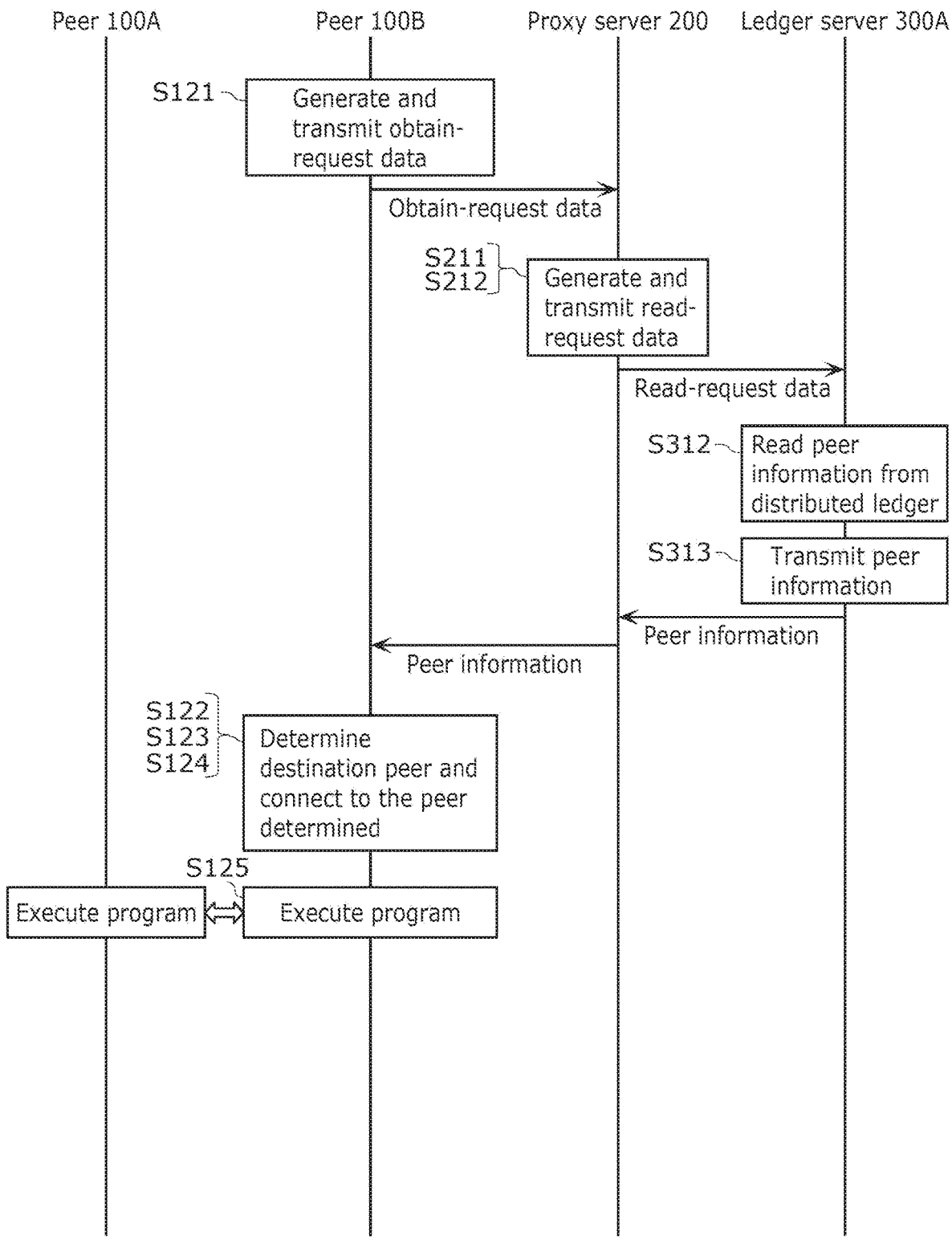
FIG. 11 is a sequence illustrating processing executed by the system to connect a new peer, according to Embodiment 1.

FIG. 11 is a sequence illustrating processing executed by system 1 to connect a new peer, according to the present embodiment. To be more specific, FIG. 11 illustrates processing performed by peer 100A, peer 100B, proxy server 200, and ledger server 300A for instance.

Peer 100B transmits obtain-request data for peer information to proxy server 200 (Step S121).

Receiving the obtain-request data, proxy server 200 transmits read-request data for the peer information to ledger server 300A for instance. A transmission destination of the read-request data may be any one of ledger servers 300A etc. The present example describes a case where the read-request data is transmitted to ledger server 300A.

Ledger server 300A receives the read-request data, reads the peer information included in the transaction data with reference to the transaction data stored in distributed ledger 305, and transmits the read peer information to proxy server 200 (Steps S312 and S313). Obtaining the peer information, proxy server 200 transmits the obtained peer information to peer 100B.

Receiving the peer information transmitted from proxy server 200, peer 100B determines a destination peer on the basis of the peer indicated by the received peer information. The present example describes a case where peer 100B determines peer 100A as the destination connection peer. Then, peer 100B executes a P2P connection with peer 100A (Steps S122 to S124).

After this, peer 100B executes a predetermined program to achieve, together with peer 100A, a predetermined function provided by P2P system 10 (Step S125).

In the above description, peer 100B executes the processing of determining the destination peer. However, this processing may be executed by ledger server 300A. In this case, ledger server 300A may execute the processing using a smart contract. By this processing, ledger server 300A reads the peer information from distributed ledger 305 and determines the destination peer on the basis of the read peer information. The use of the smart contract advantageously enables this processing to be safely executed with no involvement by a different person or a different device.

Alternatively, the processing may be executed by proxy server 200. In this case, peer 100B does not need to execute the processing. This allows a processing load of peer 100B to be reduced and thereby reduces power consumption.

1.7 Advantageous Effects of Embodiment 1

According to the present embodiment, peer 100A for instance is capable of determining a P2P destination peer on the basis of the peer information stored in distributed ledger 305. The peer information stored in distributed ledger 305 is resistant to tampering. Hence, system 1 according to the present embodiment protects the peer information from an attack made by an unauthorized operation, and thereby safely manages and provides the peer information to be used in a P2P connection.

Embodiment 2

The present embodiment describes a system that appropriately manages peer information. This system is different from system 1 according to Embodiment 1. As with system 1 according to Embodiment 1, system 1A according to the present embodiment also includes a P2P system and a P2P management system. However, system 1A is different from system 1 in that a proxy server is not included.

More specifically, the P2P management system of system 1A according to the present embodiment is directly connected (in other words, connected without a proxy server as an intermediary) to the P2P system.

2.1 Overall Configuration of System

Figure 12:
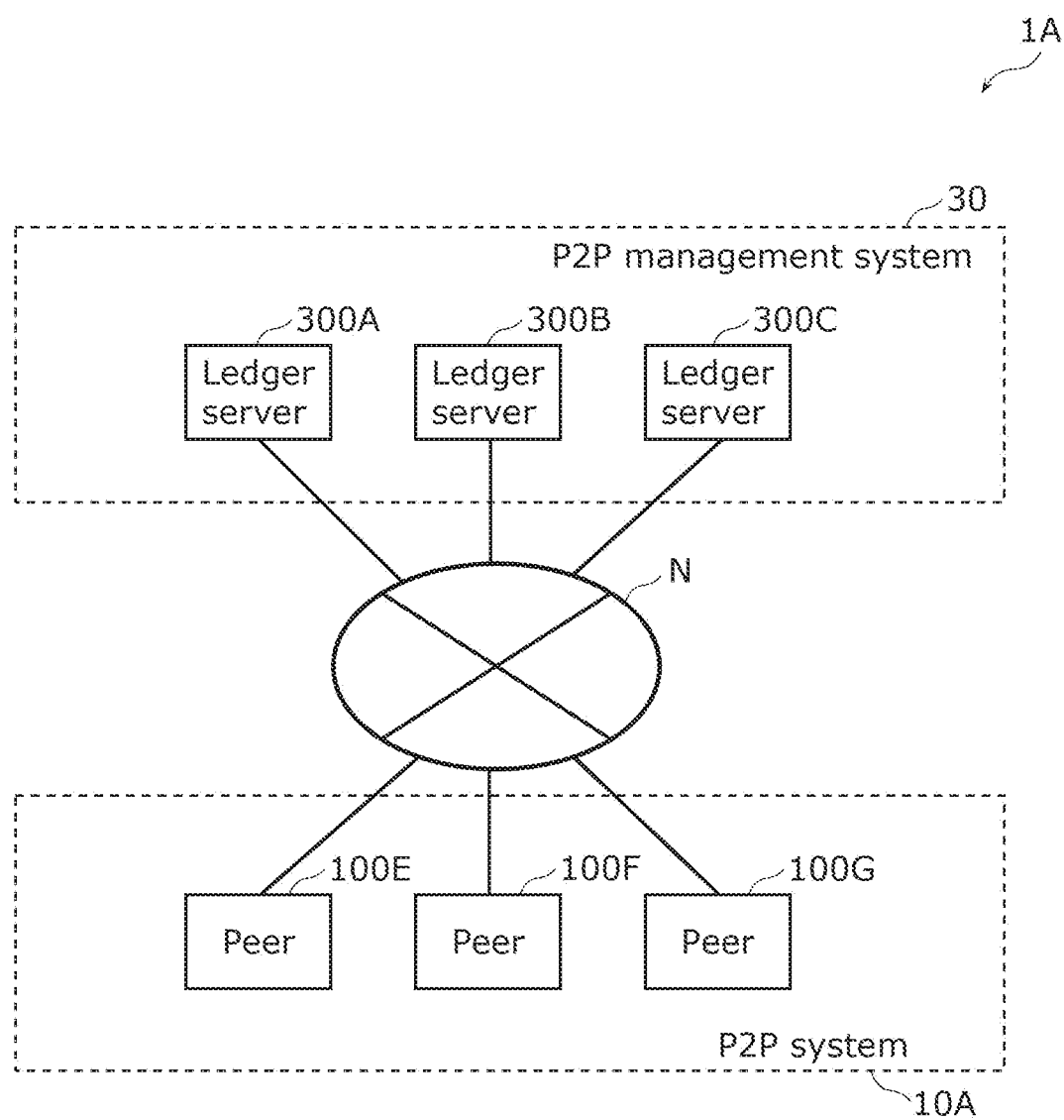
FIG. 12 schematically illustrates an overall configuration of a system according to Embodiment 2.

FIG. 12 schematically illustrates an overall configuration of system 1A according to the present embodiment.

As illustrated in FIG. 12, system 1A includes P2P system 10A, and P2P management system 30. P2P system 10A includes peers 100E, 100F, and 100G. The number of peers included in P2P system 10A is not limited to three, and may be at least one.

As with peer 100A according to Embodiment 1, peer 100E is one of P2P peers included in P2P system 10A. Moreover, peer 100E has functions of entering peer information in a distributed ledger held by P2P system 30 and reading peer information from the distributed ledger. More specifically, peer 100E has the functions of entering the peer information directly in the distributed ledger and reading the peer information directly from the distributed ledger, without a proxy server as an intermediary.

P2P management system 30 is identical to P2P management system 30 according to Embodiment 1.

2.2 Configuration of Peer 100E

Figure 13:
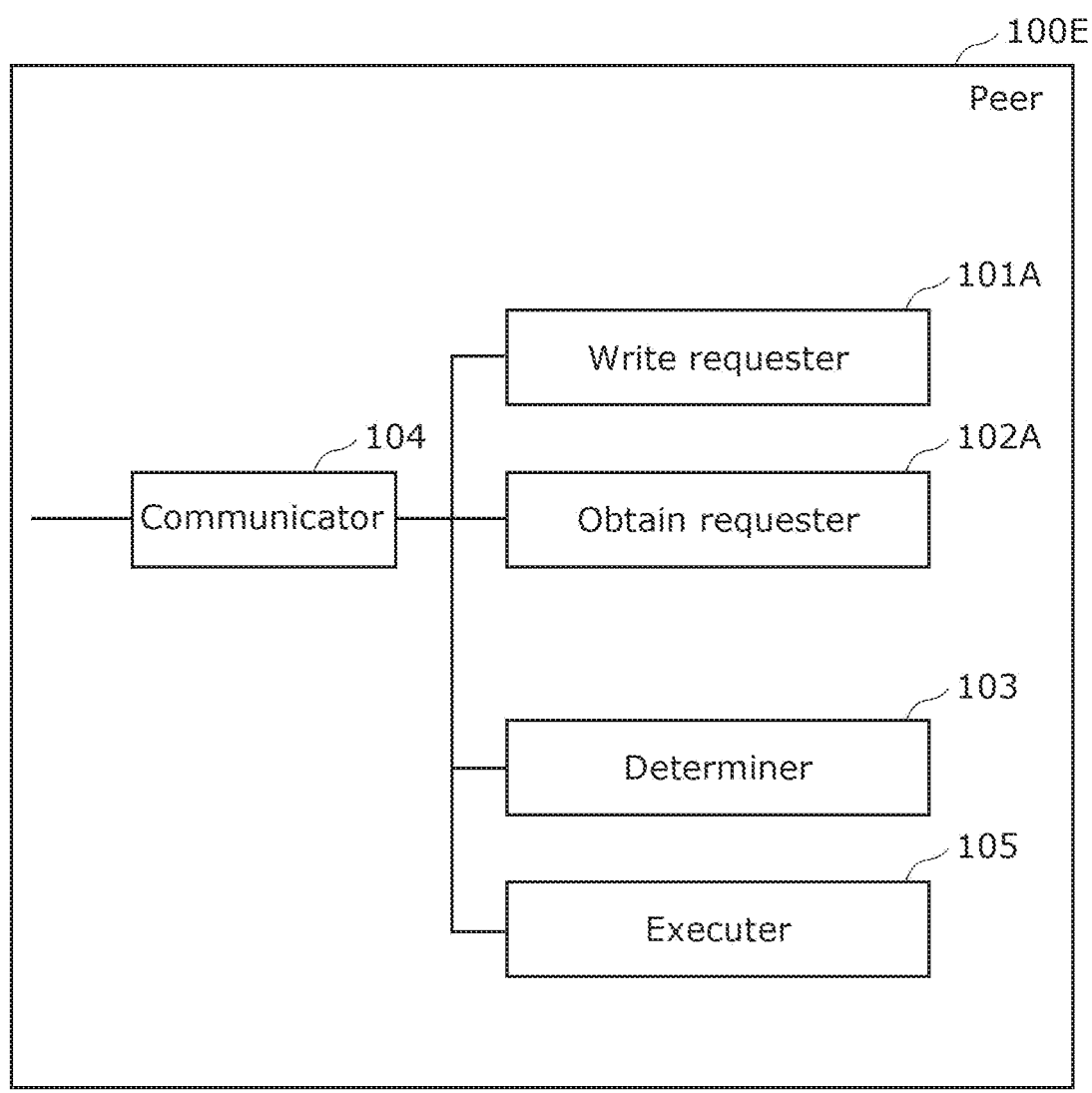
FIG. 13 is a block diagram illustrating a function configuration of a peer according to Embodiment 2.

FIG. 13 is a block diagram illustrating a function configuration of peer 100E according to the present embodiment. Note that each of peers 100F and 100G has the same configuration as peer 100E.

As illustrated in FIG. 13, peer 100E includes write requester 101A, obtain requester 102A, determiner 103, communicator 104, and executer 105. Each of these functional components included in peer 100E may be implemented by a processor (such as a CPU) that is included in peer 100E and executes a predetermined program using a memory.

Write requester 101A is a functional component that requests writing of peer information of the own peer, that is, peer 100E, into distributed ledger 305. Write requester 101A creates the peer information used for a P2P connection between the own peer, that is, peer 100E and a different peer included in P2P system 10A. Moreover, write requester 101A generates transaction data by adding a signature to the created peer information, and transmits the generated transaction data to ledger server 300A for instance. The transmitted transaction data is stored into distributed ledger 305 of ledger server 300A for instance.

Obtain requester 102A is a functional component that requests obtaining of peer information from distributed ledger 305. Obtain requester 102A generates obtain-request data used for obtaining the peer information recorded in distributed ledger 305 and transmits this generated obtain-request data to ledger server 300A. Then, obtain requester 102A obtains the peer information transmitted from ledger server 300A in response to the obtain-request data.

Determiner 103, communicator 104, and executer 105 are identical to those described in Embodiment 1.

2.3 Advantageous Effects of Embodiment 2

The configuration described above enables peer 100E etc. to directly write or read the peer information into or from the distributed ledger without a proxy server as an intermediary. This eliminates the need of a different device between peer 100E for instance and the ledger server. Thus, the ledger server advantageously manages the P2P system in a configuration from which a single point of failure is removed (in other words, a configuration with no single point of failure). Hence, the configuration with a relatively high availability enables the server to appropriately manage the peer information.

Embodiment 3

The present embodiment describes a system that appropriately manages peer information. This system is different from systems 1 and 1A according to Embodiments 1 and 2. System 1B according to the present embodiment includes the P2P system and the P2P management system included in system 1A according to Embodiment 2. Moreover, this P2P system also functions as a P2P management system that manages peer information used by a P2P management system functioning as a different P2P system.

3.1 Overall Configuration of System

Figure 14:
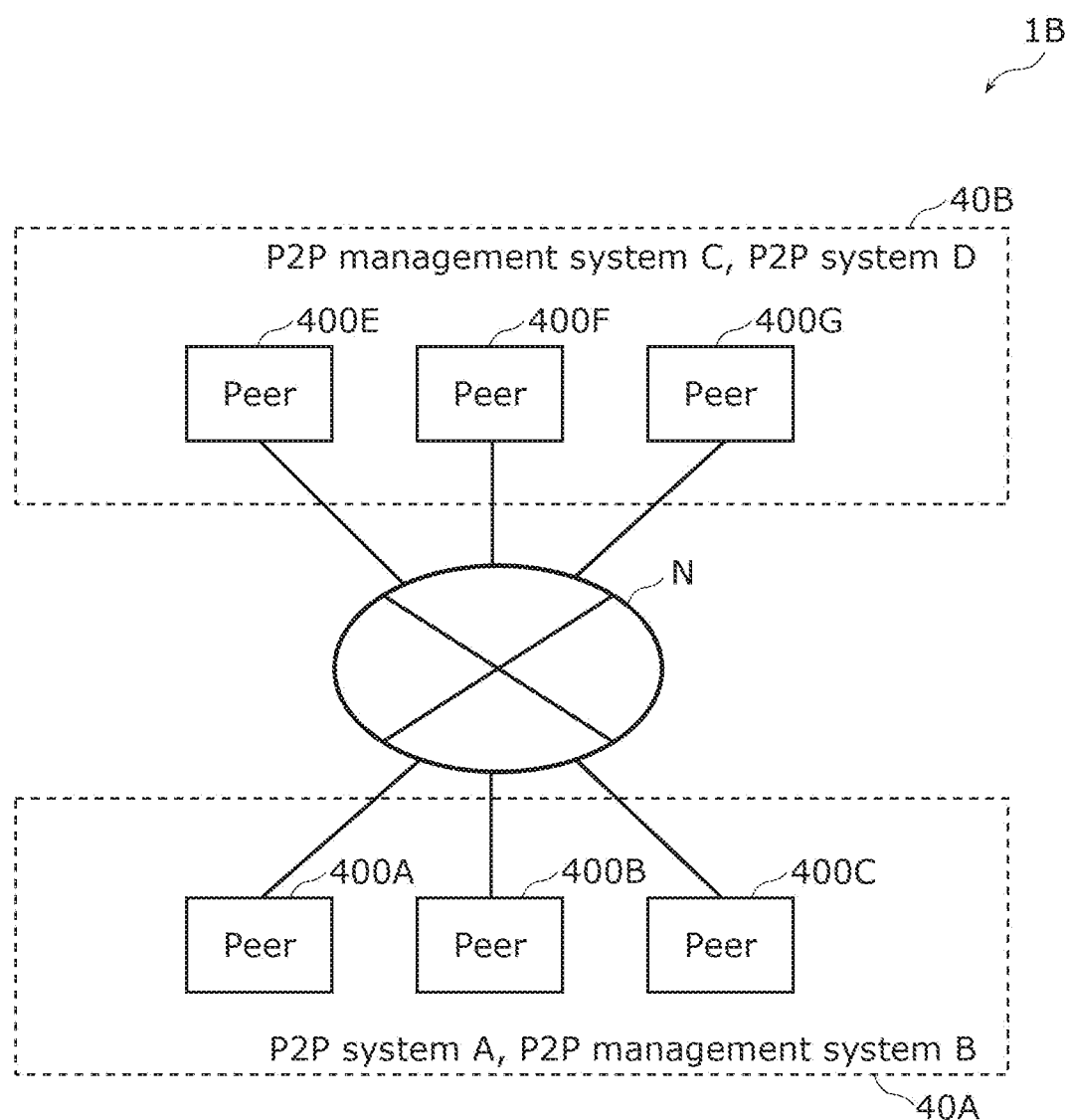
FIG. 14 schematically illustrates an overall configuration of a system according to Embodiment 3.

FIG. 14 schematically illustrates an overall configuration of system 1B according to the present embodiment.

As illustrated in FIG. 14, system 1B includes systems 40A and 40B. System 40A is P2P system A, and is also P2P management system B that manages peer information used in P2P system D (or more specifically, system 40B). System 40B is P2P system D, and is also P2P management system C that manages peer information used by P2P system A (or more specifically, system 40A).

To be more specific, systems 40A and 40B are the P2P systems and at the same time are the P2P management systems that manage each other's P2P management information.

System 40A includes peers 400A, 400B, and 400C. The number of peers included in system 40A is not limited to three, and may be at least one. System 40B includes peers 400E, 400F, and 400G. The number of peers included in system 40B is not limited to three, and may be at least one.

As with peer 100E according to Embodiment 2, peer 400A is one of P2P peers included in system 40A that is the P2P system. Moreover, peer 400A has functions of entering peer information in a distributed ledger held by system 40A and reading peer information from the distributed ledger.

Each of peers 400B and 400C has the same function as peer 400A, and operates independently of peer 400A.

As with peer 100E according to Embodiment 2, peer 400E is one of P2P peers included in system 40B that is the P2P system. Moreover, peer 400E has functions of entering peer information in a distributed ledger held by system 40A and reading peer information from the distributed ledger.

Each of peers 400F and 400G has the same function as peer 400E, and operates independently of peer 400E.

3.2 Configuration of Peer 400A

Figure 15:
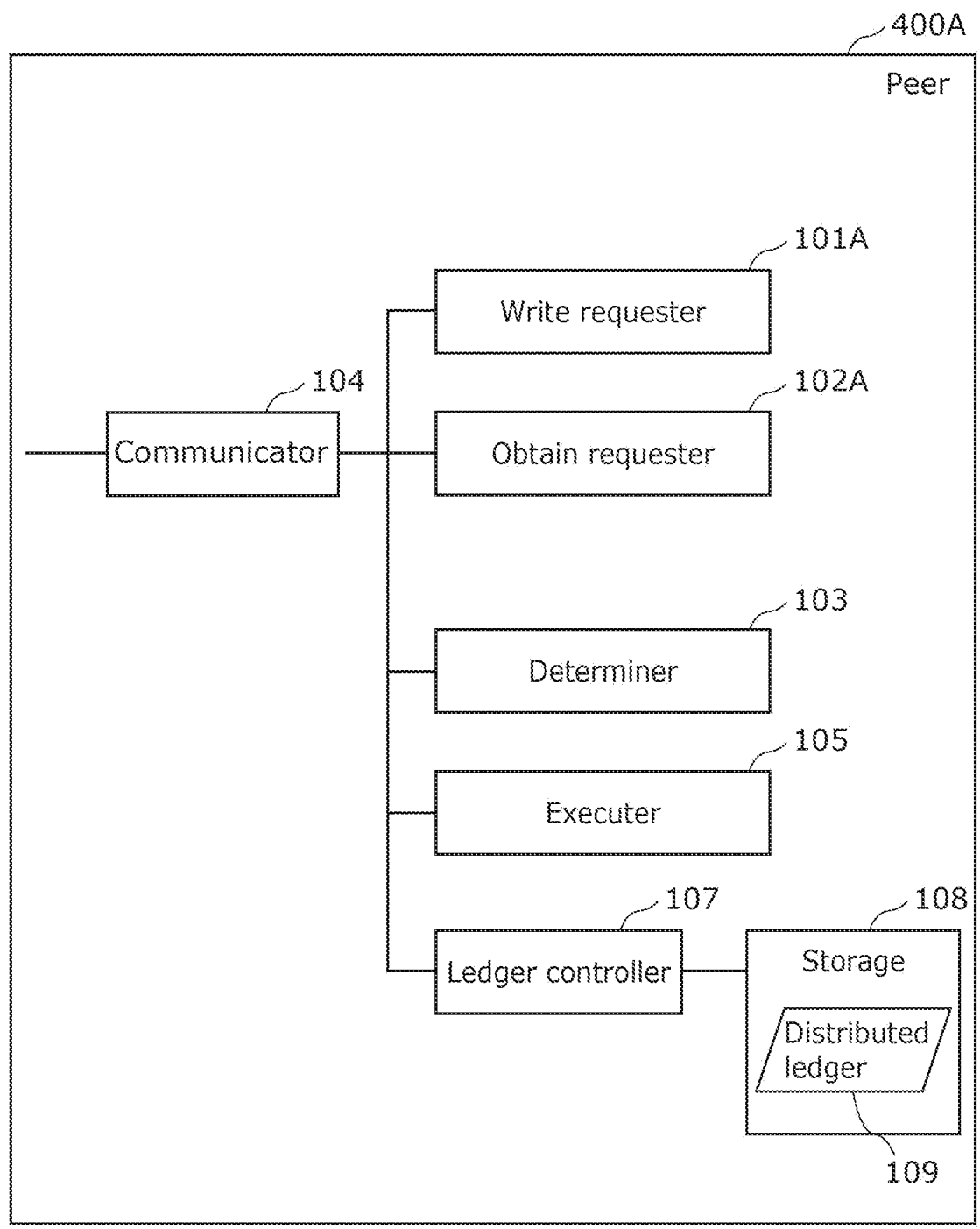
FIG. 15 is a block diagram illustrating a function configuration of a peer according to Embodiment 3.

FIG. 15 is a block diagram illustrating a function configuration of peer 400A according to the present embodiment. Note that each of peers 400B and 400C and each of peers 400E, 400F, and 400G has the same configuration as peer 400A.

As illustrated in FIG. 15, peer 400A includes write requester 101A, obtain requester 102A, determiner 103, communicator 104, executer 105, ledger controller 107, and storage 108. Each of these functional components included in peer 400A may be implemented by a processor (such as a CPU) that is included in peer 400A and executes a predetermined program using a memory.

Write requester 101A, obtain requester 102A, determiner 103, communicator 104, and executer 105 are identical to those included in peer 100E according to Embodiment 2.

Moreover, ledger controller 107 and storage 108 are identical, respectively, to ledger controller 301 and storage 303 included in ledger server 300A according to Embodiment 1. Storage 108 stores distributed ledger 109 identical to distributed ledger 305 according to Embodiment 1.

The aforementioned functional components in peer 400A enables peer 400A to function as one of the peers included in P2P system A and also as one of the peers included in P2P management system B. This also applies to peers 400B and 400C.

Having the same configuration as peer 400A, each of peers 400E, 400F, and 400G functions as one of the peers included in P2P system D and also as one of the peers included in P2P management system C.

In this way, systems 40A and 40B function as the P2P systems and also as the P2P management systems that manage each other's P2P management information.

3.3 Advantageous Effects of Embodiment 3

The configuration described above enables system 40A including peer 400A etc. and system 40B including peer 400E etc. to function as separate P2P systems. These separate systems appropriately manage each other's peer information and also support reliability of each other's peer information.

Supplemental Remarks

A blockchain according to Embodiments described above is complementally described.

Figure 16:
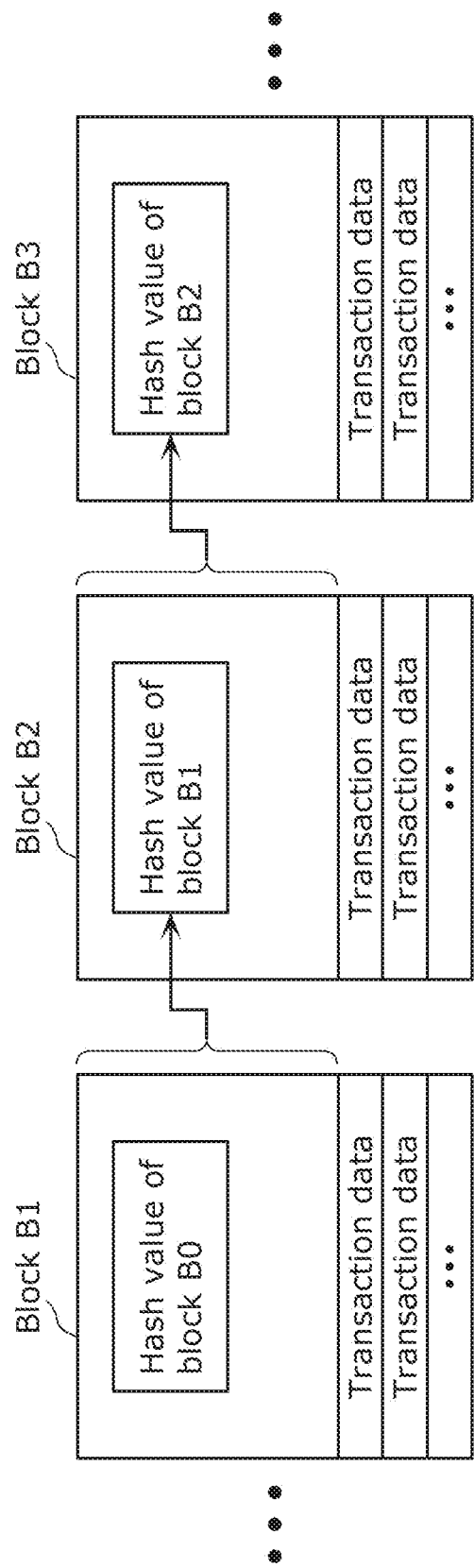
FIG. 16 illustrates a data structure of a blockchain.

FIG. 16 illustrates a data structure of a blockchain.

A blockchain includes blocks, each being a unit of recording, and forms a chain by linking the blocks together. Each of the blocks includes a plurality of items of transaction data and a hash value of an immediately preceding block. To be more specific, block B2 includes a hash value of block B1 that is the immediately preceding block. Then, a hash value calculated from the plurality of items of transaction data included in block B2 and the hash value of block B1 is contained as the hash value of block B2 in block B3. In this way, blocks contain the information of the preceding block as the hash value, forming a chain. This effectively prevents the recorded transaction data from tampering.

If the transaction data in the past is modified, the hash value of the block is different from the value before the modification. To make the tampered block appear correct, all the subsequent blocks need to be altered. Realistically, this is extremely difficult. Such characteristics of blockchains assure resistance to tampering.

Figure 17:
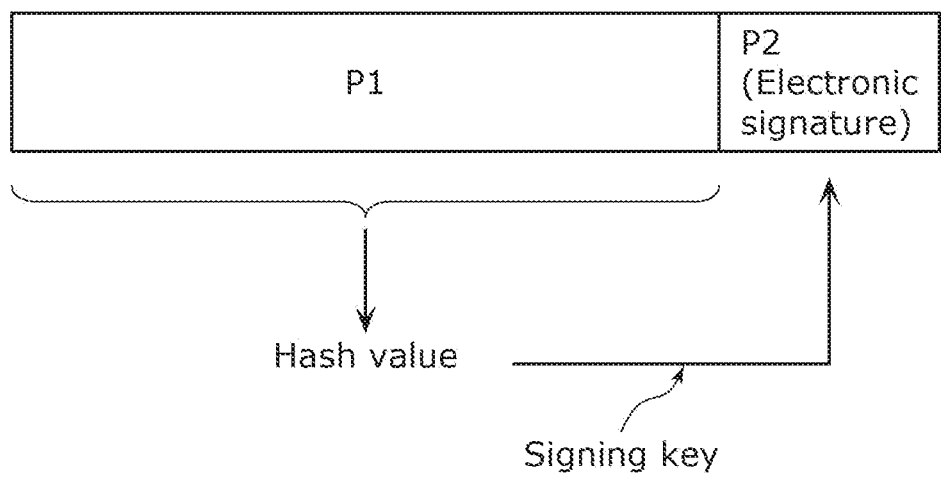
FIG. 17 illustrates a data structure of transaction data.

FIG. 17 illustrates a data structure of transaction data.

Transaction data illustrated in FIG. 17 includes transaction data body P1 and electronic signature P2. Transaction data body P1 is a data body included in the transaction data. Electronic signature P2 is signed using a signing key of a creator of the transaction data. More specifically, electronic signature P2 is generated through encryption using a private key of the creator.

It is substantially impossible to tamper with the transaction data including electronic signature P2. This prevents the transaction data body from tampering.

Other Embodiments

Although the present disclosure in an aspect or aspects has been described by way of Embodiments above, it should be obvious that the present disclosure is not limited to Embodiments described above. Embodiments described below are also included in the present disclosure.

(1) In Embodiment 1, peer 100A etc. and proxy server 200 are described as separate devices. However, peer 100A etc. and proxy server 200 may be included in a single device. An example of this case where the single device is used is described in Embodiment 2.

(2) In Embodiment 1, peer 100A etc. and ledger server 300A etc. are described as separate devices. However, peer 100A itself may be ledger server 300A. Moreover, a distributed ledger different from the distributed ledger used by ledger server 300A may be used. Furthermore, the systems may store each other's peer information. An example of this case where the systems store each other's peer information is described in Embodiment 3.

(3) In Embodiment 1, proxy server 200 is described as a single proxy server. However, proxy server 200 may include a plurality of devices.

(4) In Embodiment 1, the ledger server executes the peer-information reading processing by simply reading the peer information from the storage device. However, this reading processing may be freely executed by using a smart contract, for instance. For example, determiner 103 of peer 100A may be included in ledger server 300A. In this case, the destination peer of the P2P peer may be determined using the obtained peer information as it is. Then, determiner 103 is also stored in the distributed ledger. Thus, this case has an advantage that the P2P peer information is referenced more securely.

(5) A range within which peer information of a different peer is obtained for a P2P connection may be a range including all peers participating the P2P system or any given range. Within any given range, a condition may be set so that the peer information is obtained in descending order according to the duration of connection between the peer and the P2P system. As in the case of reconnection for instance, to obtain a latest version of the peer information that has been previously obtained, the peer having this target peer information may be designated.

(6) Specifically, each of the above-described devices according to the above embodiments may be a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the devices execute their functions. Here, the computer program includes combinations of instruction codes for issuing instructions to the computer to execute predetermined functions.

(7) Some or all of the constituent elements in each of the devices according to the above embodiments may be implemented into a single Large Scale Integration (LSI). The system LSI is a super multi-function LSI that is a single chip into which a plurality of constituent elements are integrated. More specifically, the system LSI is a computer system including a microprocessor, a ROM, a RAM, and the like. The RAM holds a computer program. The microprocessor operates according to the computer program, thereby causing the system LSI to execute its functions.

The constituent elements in each of the devices may be formed as separate chips, or may be formed as one chip so as to include the entire configuration or a part of the configuration.

The terminology "system LSI circuit" depends on the degree of integration, and may also be referred to as IC, LSI circuit, super LSI circuit, or ultra LSI circuit. Moreover, the method of circuit integration is not limited to LSI. Integration may be achieved with a specialized circuit or a general purpose processor. After the LSI circuit is manufactured, a field programmable gate array (FPGA) or a reconfigurable processor capable of reconfiguring the connections and settings of the circuit cells in the LSI circuit may be used.

Furthermore, if an integrated circuit technology that replaces LSI emerges from advances in or derivations of semiconductor technology, integration of functional blocks using such technology may also be used. Application of biotechnology is also a possibility.

(8) It should also be noted that some or all of the constituent elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may be tamper resistant.

(9) The present disclosure may be the methods described above. Each of the methods may be a computer program causing a computer to execute the steps included in the method. Moreover, the present disclosure may be digital signals of the computer program.

The present disclosure may be a computer-readable recording medium on which the computer program or the digital signals are recorded. Examples of the computer-readable recording medium are a flexible disk, a hard disk, a Compact Disc-Read Only Memory (CD-ROM), a magneto-optic disk (MO), a Digital Versatile Disc (DVD), a DVD-ROM, a DVD-RAM, a BD (Blu-ray (registered trademark) Disc), and a semiconductor memory. The present disclosure may be the digital signals recorded on the recording medium.

The present disclosure may be implemented by transmitting the computer program or the digital signals via an electric communication line, a wired or wireless communication line, a network represented by the Internet, data broadcasting, and the like.

The present disclosure may be a computer system including a microprocessor and a memory. The memory stores the computer program and the microprocessor operates according to the computer program.

The program or the digital signals may be recorded onto the recording medium to be transferred, or may be transmitted via a network or the like, so that the program or the digital signals can be executed by a different independent computer system.

(10) The present disclosure may be any combination of the above-described embodiments and variations.

(11) If the destination peer has a communication failure, this communication failure may be written into the distributed ledger. In this case, such communication failure may be written into the distributed ledger only if it is determined that a predetermined number of peers or more have communication failures.

Each of the constituent elements in each of the above-described embodiments may be configured in the form of an exclusive hardware product, or may be implemented by executing a software program suitable for the constituent element. Each of the constituent elements may be implemented by means of a program executer, such as a CPU and a processor, reading and executing the software program recorded on a recording medium, such as a hard disk or a semiconductor memory. Here, the software program for implementing the server according to each of the embodiments is a program described below.

The program causes a computer to execute a control method that is executed by one of a plurality of servers included in a P2P management system, each of the plurality of servers holding a distributed ledger. The control method includes: receiving transaction data that includes (i) peer information used for connection between a first peer and a different peer both included in a plurality of peers included in a P2P system and (ii) a signature added to the peer information by the first peer; verifying the transaction data received, using the signature included in the transaction data received; and storing the transaction data into the distributed ledger if the verifying is successful.

Moreover, the program causes a computer to execute a control method used by a proxy server that acts as an intermediary between a P2P system and a P2P management system that includes a plurality of servers each of which holds a distributed ledger. The control method includes: receiving (i) peer information used for connection between a first peer and a different peer both included in a plurality of peers included in the P2P system and (ii) a signature added to the peer information by the first peer; and generating transaction data that includes the peer information received and the signature received, and transmitting the transaction data generated to the plurality of servers included in the P2P management system.

Although the control method and so forth according to the present disclosure in an aspect or aspects have been described by way of the embodiments above, it should be obvious that the present disclosure is not limited to the embodiments described above. Other embodiments implemented through various changes and modifications conceived by a person of ordinary skill in the art or through a combination of the constituent elements in different embodiments described above may be included in the scope in an aspect or aspects according to the present disclosure, unless such changes, modifications, and combination depart from the scope of the present disclosure.

INDUSTRIAL APPLICABILITY

The system according to the present disclosure manages and shares the peer information (P2P connection information) of the P2P system. This system includes a mechanism that safely manages and shares the peer information of the P2P system and is useful as a peer management system of any kind of P2P system.

The invention claimed is:

1. A control method that is executed by a server among servers included in a management system, each of the servers holding a distributed ledger, the control method comprising:
receiving transaction data including first peer information and a signature, the first peer information being information about a first peer and being used for connecting the first peer among peers in a peer-to-peer (P2P) system to another peer among the peers, the P2P system being different from the management system which includes the servers each holding the distributed ledger;
verifying the received transaction data using the signature included in the transaction data; and
storing the transaction data into the distributed ledger of the server when the verifying is successful, wherein
one or more items of peer information obtained from the peers is stored in the distributed ledger in the management system, the one or more items of peer information including first peer information of the first peer, and
the control method further comprises:
when receiving a read-request of the one or more items of peer information from a second peer that is different from the first peer, reading the one or more items of peer information stored in the distributed ledger;
transmitting second peer information to the second peer, the second peer information indicating one peer whose physical distance from the second peer is within or out of a predetermined range among the peers; and
the second peer connects with the one peer whose physical distance from the second peer is within or out of a predetermined range among the peers, to form the P2P system.

2. The control method according to claim 1, wherein the transaction data is transaction data generated to include the peer information that is updated, the generating being performed when the peer information held by the first peer is updated.

3. The control method according to claim 1, further comprising:
when a request for reading of the peer information is received,
reading the peer information from the transaction data stored in the distributed ledger; and
transmitting the peer information to a requesting peer that has transmitted the request among the peers.

4. The control method according to claim 3, wherein
in the reading, one or more items of peer information are read as the peer information, the one or more items of peer information each corresponding to a respective one of one or more peers among the peers and each being read with reference to the distributed ledger, and
in the transmitting, at least one item of peer information having a parameter within a predetermined range is transmitted as the peer information, the at least one item of peer information being included in the one or more items of peer information read in the reading, the predetermined range indicating that a corresponding peer of the item of peer information is appropriate for connection.

5. The control method according to claim 3, wherein
in the reading, one or more items of peer information are read as the peer information, the one or more items of peer information each corresponding to a respective one of one or more peers among the peers and each being read with reference to the distributed ledger, and
the transmitting includes:
determining an appropriate peer that is appropriate for connection, on the basis of the one or more items of peer information read in the reading; and
transmitting an item of peer information corresponding to the appropriate peer determined in the determining.

6. The control method according to claim 1, wherein the storing includes:
sharing the transaction data among the servers and executing a predetermined consensus algorithm on the transaction data; and
when validity of the transaction data is agreed upon by the servers in the executing, storing the transaction data into the distributed ledger of each of the servers.

7. The control method according to claim 1, wherein the peer information includes at least one of:
identification information of the first peer;
an Internet Protocol (IP) address of the first peer;
a port number to be used by the first peer to communicate with another peer among the peers;
identification information of a peer currently connected to the first peer;
a duration of participation of the first peer in the P2P system;
a duration of connection between the first peer and the peer currently connected to the first peer;
a public key of the first peer; or
a maximum allowable number of connections of the first peer.

8. The control method according to claim 1, wherein
the management system is connected to the P2P system via a proxy server,
the first peer transmits the peer information and the signature to the proxy server,
the proxy server generates proxy transaction data that includes the peer information and the signature transmitted by the first peer, and transmits the proxy transaction data generated to the server, and
in the receiving, the proxy transaction data transmitted by the proxy server is received as the transaction data.

9. The control method according to claim 1, wherein the management system is connected to the P2P system.

10. A non-transitory computer-readable recording medium having recorded thereon a computer program for causing a computer to execute the control method according to claim 1.

11. The control method according to claim 1, wherein
before transmitting the one or more items of peer information read to the second peer,
transmitting, to the second peer, peer information indicating at least one of, among the peers, a peer whose physical distance from the second peer is out of a predetermined range, a peer connected to more than a predetermined number of peers, a peer connected to peers a total number of which is within a predetermined range, a peer that has been participating in the P2P system for a duration longer than a predetermined duration, and a peer that has been participating in the P2P system for a duration that is within a predetermined range.

12. A control method used by a proxy server that acts as an intermediary between a peer-to-peer (P2P) system and a management system, the management system including servers each holding a distributed ledger, the control method comprising:

receiving first peer information and a signature, the first peer information being information about a first peer and being used for connecting the first peer among peers in the P2P system to another peer among the peers, the P2P system being different from the management system which includes the servers each holding the distributed ledger;

generating transaction data that includes the peer information and the signature each received in the receiving; and transmitting the transaction data generated to the servers included in the management system, wherein one or more items of peer information obtained from the peers is stored in the distributed ledger in the management system, the one or more items of peer information including first peer information of the first peer, and the control method further comprises:

when receiving a read-request of the one or more items of peer information from a second peer that is different from the first peer, reading the one or more items of peer information stored in the distributed ledger;

transmitting second peer information to the second peer, the second peer information indicating one peer whose physical distance from the second peer is within or out of a predetermined range among the peers; and the second peer connects with the one peer whose physical distance from the second peer is within or out of a predetermined range among the peers, to form the P2P system.

13. A server among servers included in a management system, each of the servers holding a distributed ledger, the server comprising:

a ledger controller implemented by a processor; and
a storage that stores the distributed ledger,
wherein the ledger controller performs:
receiving transaction data including first peer information and a signature, the first peer information being information about a first peer and being used for connecting the first peer among peers in a peer-to-peer (P2P) system to another peer among the peers, the P2P system being different from the management system which includes the servers each holding the distributed ledger;

verifying the received transaction data using the signature included in the transaction data; and storing the transaction data into the distributed ledger when the transaction data is verified successfully, wherein one or more items of peer information obtained from the peers is stored in the distributed ledger in the management system, the one or more items of peer information including first peer information of the first peer, and the control method further comprises:

when receiving a read-request of the one or more items of peer information from a second peer that is different from the first peer, reading the one or more items of peer information stored in the distributed ledger;

transmitting second peer information to the second peer, the second peer information indicating one peer whose physical distance from the second peer is within or out of a predetermined range among the peers; and the second peer connects with the one peer whose physical distance from the second peer is within or out of a predetermined range among the peers, to form the P2P system.

\* \* \* \* \*